(12) United States Patent
Gho et al.

(10) Patent No.: US 10,051,618 B2
(45) Date of Patent: Aug. 14, 2018

(54) METHODS AND DEVICES FOR CONTROL CHANNEL DECODING

(71) Applicant: INTEL IP CORPORATION, Santa Clara, CA (US)

(72) Inventors: Gwang-Hyun Gho, Cupertino, CA (US); Joan Anton Olivella, Dresden (DE); Alemayehu Seyoum, San Diego, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 125 days.

(21) Appl. No.: 15/200,077

(22) Filed: Jul. 1, 2016

(65) Prior Publication Data
US 2018/0007664 A1 Jan. 4, 2018

(51) Int. Cl.
*H04J 3/24* (2006.01)
*H04W 72/04* (2009.01)
*H04L 1/00* (2006.01)
*H04L 1/20* (2006.01)
*H04L 1/08* (2006.01)
*H04L 5/00* (2006.01)

(52) U.S. Cl.
CPC ......... *H04W 72/042* (2013.01); *H04L 1/0038* (2013.01); *H04L 1/0046* (2013.01); *H04L 1/0057* (2013.01); *H04L 1/0072* (2013.01); *H04L 1/08* (2013.01); *H04L 1/203* (2013.01); *H04L 1/0013* (2013.01); *H04L 1/0052* (2013.01); *H04L 5/0053* (2013.01)

(58) Field of Classification Search
CPC .... H04W 72/042; H04L 1/0057; H04L 1/203; H04Q 11/06; H04J 2203/0005; H04J 3/08

USPC .......................... 370/389, 349, 470, 471, 472
See application file for complete search history.

(56) References Cited

U.S. PATENT DOCUMENTS

2010/0150090 A1   6/2010   Park et al.
2012/0093118 A1   4/2012   Peters
(Continued)

FOREIGN PATENT DOCUMENTS

EP   2566091 A1   3/2013
WO   2009074611 A2   6/2009

OTHER PUBLICATIONS

"Evolved Universal Terrestrial Radio Access (E-UTRA), Multiplexing and channel coding", V13.1.0 (Release 13), 2016, TS 36.212, pp. 95-121 (5.3.3), 3GPP Organizational Partners.
(Continued)

*Primary Examiner* — Brenda H Pham
(74) *Attorney, Agent, or Firm* — Viering, Jentschura & Partner mbB

(57) ABSTRACT

A circuit arrangement includes a control circuit configured to identify a candidate message in received control data that indicates a potential location of an encoded message in the received control data, the candidate message having a predefined message bit length, a measurement circuit configured to perform a radio measurement, the control circuit further configured to compare the radio measurement to a predefined threshold, and a decoding circuit further configured to, if the radio measurement satisfies the predefined threshold, search for the encoded message in the received control data by decoding the candidate message from the received control data with a reduced message bit length less than the predefined bit length.

22 Claims, 11 Drawing Sheets

(56) References Cited

U.S. PATENT DOCUMENTS

| | | | |
|---|---|---|---|
| 2013/0195041 A1* | 8/2013 | Papasakellariou .. | H04W 72/042 370/329 |
| 2014/0274169 A1* | 9/2014 | Ta ........................ | H04W 12/02 455/458 |
| 2015/0117353 A1* | 4/2015 | Takeda ................ | H04W 72/042 370/329 |

OTHER PUBLICATIONS

"Evolved Universal Terrestrial Radio Access (E-UTRA), Physical layer procedures", V13.1.1 (Release 13), 2016, TS 36.213, p. 56 (table 7.1-5), 3GPP Organizational Partners.
Michael L. Honig et al., "Reliability-Based Incremental Redundancy With Convolutional Codes", IEEE Transactions on Communications, vol. 53, No. 6, Jun. 2005, pp. 987-997.
European Search Report based on application No. 17 17 5594.5 (13 pages) dated Nov. 29, 2017 (for reference purpose only).

\* cited by examiner

METHODS AND DEVICES FOR CONTROL CHANNEL DECODING

TECHNICAL FIELD

Various embodiments relate generally to methods and devices for control channel decoding.

BACKGROUND

Long Term Evolution (LTE) networks may transmit control information at the beginning of each downlink transmission period. As specified by the $3^{rd}$ Generation Partnership Project (3GPP), LTE cells may transmit with a 1 ms Transmission Time Interval (TTI), where each 1 ms TTI is a subframe and groups of 10 consecutive subframes are grouped into radio frames. The first several (e.g. between one and four) symbol periods of each subframe may then be allocated for control information, which may be transmitted on the Physical Downlink Control Channel (PDCCH). Mobile terminals connected to a given LTE cell may then need to read the PDCCH symbols at the beginning of each subframe in order to obtain essential control information, which may include uplink transmission grants, downlink scheduling messages, transmit power control messages, etc.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
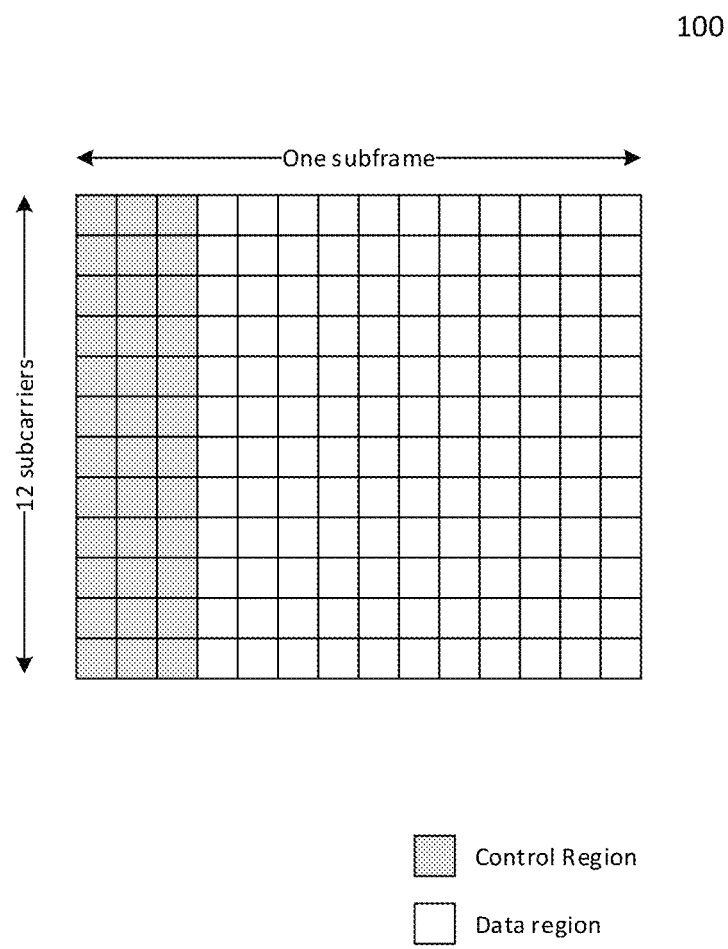
FIG. 1 shows an LTE resource grid.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description and the claims expressly refer to a quantity greater than one. The terms "group (of)", "set [of]", "collection (of)", "series (of)", "sequence (of)", "grouping (of)", etc., and the like in the description and in the claims, if any, refer to a quantity equal to or greater than one, i.e. one or more. Any term expressed in plural form that does not expressly state "plurality" or "multiple" refers to a quantity equal to or greater than one. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup tables and other array indexing or searching operations.

As specified by the $3^{rd}$ Generation Partnership Project (3GPP), Long Term Evolution (LTE) cells may perform downlink transmissions according to 10 ms radio frames that are each divided into 10 subframes of 1 ms duration each, i.e. 10 Transmission Time Intervals (TTI). Each subframe may be further divided into two slots (each of 0.5 ms duration) of either 6 or 7 symbol periods each (depending on the Cyclic Prefix (CP) length), where each symbol period may contain one Orthogonal Frequency Division Multiplexing (OFDM) symbol per subcarrier.

The LTE system bandwidth may be distributed across a set of evenly-spaced subcarriers, which as noted above may each carry a single OFDM symbol per symbol period. As defined by the 3GPP, the subcarriers may be uniformly positioned on a 15 kHz grid and include a central DC subcarrier; accordingly, the number of subcarriers may vary between 73 and 1201 according to the variable 1.4 to 20 MHz system bandwidth. Each symbol period per subcarrier may be defined as a Resource Element (RE), and accordingly each RE (per antenna port) may hold a single OFDM symbol. REs may be further grouped into RE Groups (REG), which is a group of 4 consecutive REs (not including reference signal REs), and Resource Blocks (RB), which is a time-frequency block spanning one slot (6 or 7 symbols) and 12 subcarriers (180 kHz), e.g. a block of 84 REs for normal CP.

FIG. 1 shows an exemplary downlink LTE resource grid 100 depicting 12 subcarriers over a single subframe with a normal CP length. Each LTE cell may need to transmit both control and user data traffic during each subframe; accordingly, as shown in FIG. 1 each subframe may be divided into a control region and a data region, where the control region occurs in the first several symbols of each subframe and the data region occupies the remaining symbols. The control region may contain symbols allocated for the Physical Control Format Indicator Channel (PCFICH), Physical Hybrid Automatic Repeat Request (HARM) Indicator Channel (PHICH), and Physical Downlink Control Channel (PDCCH) (where certain other REs in the control region may be allocated for reference signals or are left vacant).

LTE mobile terminals (also known as User Equipment (UE)) may need to receive control information contained in the control region in order to support both downlink and uplink communications. As previously noted, the control region may vary in size between 1 and 4 symbols at the beginning of each subframe. LTE cells may broadcast the size of the control region for each subframe on the PCFICH, which may be mapped to 16 REs in the first symbol period of each subframe and may specify the Control Format Indicator (CFI). Mobile terminals may thus receive the PCFICH during the first symbol of each subframe and utilize the CFI specified thereon to establish the size of the control region for the current subframe. For example, the CFI in the exemplary scenario of resource grid 100 may specify that the control region is three symbols in length, i.e. the first three symbols of the subframe.

Identification of the CFI from PCFICH data may then allow mobile terminals to read the PDCCH data of the subframe, which may be essential to both uplink and downlink communications. In particular, PDCCH data may include uplink and downlink scheduling messages in addition to transmit power control (TPC) instructions. Each PDCCH message may be in a particular format known as a Downlink Control Information (DCI) Format, where different DCI formats may be utilized for different types of PDCCH messages. For example, DCI Formats 0 and 4 may be used for uplink scheduling grants and assignments, which an LTE cell may utilize in order to instruct a mobile terminal of transmission and scheduling parameters for uplink transmissions in the current subframe, while DCI Formats 1 and 2 may be utilized for downlink scheduling assignments and DCI Format 3 may be utilized for TPC commands. The 3GPP has also defined additional DCI formats, such as e.g. DCI Format 1A, 2A, etc., in order to handle the various single- and multi-antenna LTE transmission modes. Mobile terminals may thus need to reliably receive the relevant DCIs in order to support uplink and downlink communications in each subframe. Depending on the specific format, certain DCI formats may need to contain more information (e.g. to schedule more complex transmissions such as Multiple Input Multiple Output (MIMO) transmissions); accordingly, LTE cells may need to transmit more payload data for some DCI formats than others.

As an LTE cell will conventionally serve multiple mobile terminals during each subframe, LTE cells may need to allocate PDCCH messages for multiple mobile terminals during each control region. Accordingly, an LTE cell may need to select control symbols to apportion for each PDCCH message; as a result, mobile terminals will need to search through the control region in order to identify which PDCCH data are of interest.

LTE cells may perform the resource mapping for PDCCH messages according to Control Channel Elements (CCE), which may each be composed of 9 REGs (each composed of four consecutive non-reference signal REs) in the control region that are allocated to the PDCCH. More specifically, LTE cells may map each PDCCH message (each DCI Format message) to any of 1, 2, 4, or 8 CCEs, where the number of CCEs utilized for a given PDCCH message corresponds to the aggregation level of the PDCCH message. As specified by the 3GPP, PDCCH employ utilize Quadrature Phase-Shift Keying (QPSK) as the modulation scheme, which may be able to transmit 2 bits per QPSK symbol. Given the 4 REs (one symbol each) per REG and 9 REGs per CCE, each CCE may thus have capacity for 72 total bits.

As the control region may be shared between all mobile terminals being serviced by a given LTE cell, the PDCCH messages intended for multiple different mobile terminals may all be placed close to one another in the control symbols; accordingly, there may be many different locations where the PDCCH message addressed to a given mobile terminal may be placed in the control region. The placement of the PDCCH message for each mobile terminal within the control region may switch every subframe, and as a result a given mobile terminal may therefore need to 'search' through the CCEs in each subframe in order to identify which PDCCH messages are intended for the mobile terminal.

Figure 2:
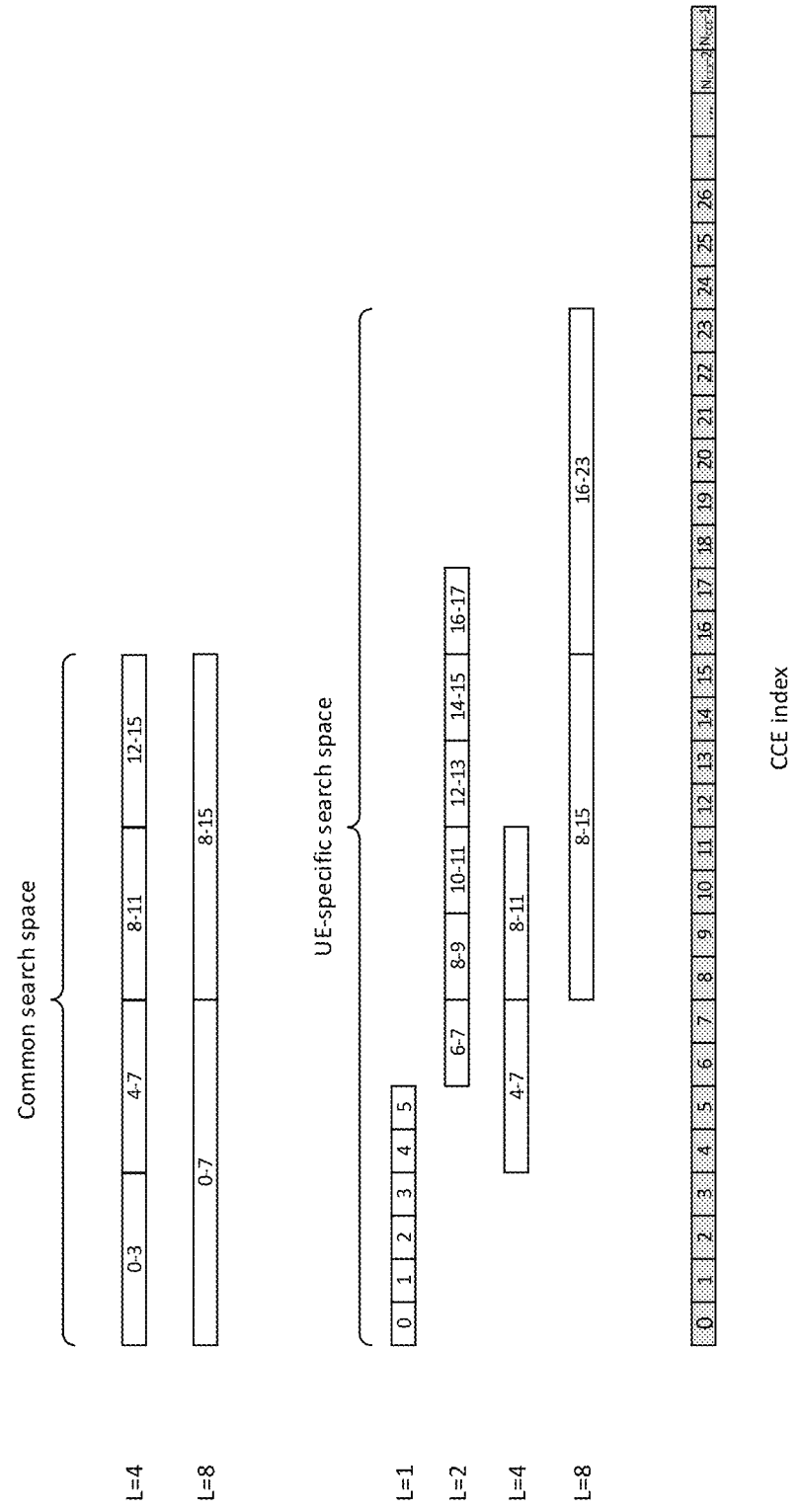
FIG. 2 shows CCEs of a PDCCH search space.

As previously noted, some PDCCH messages may be addressed to groups of mobile terminals while other PDCCH messages may be addressed to specific mobile terminals. Accordingly, the CCEs of each control region may be divided into a common search space and UE-specific search spaces, where the CCEs in the common search space may contain PDCCH messages addressed to groups of mobile terminals and CCEs in each UE-specific search space (one per UE) may contain PDCCH messages addressed to a particular UE. The CCEs of each control region thus each be assigned a CCE index to differentiate between the CCEs, where the specific mapping between CCE index and the physical REs of each subframe may depend on the number of reference symbols, CFI, etc. FIG. 2 shows an exemplary depiction of the common and UE-specific search spaces for a set of $N_{CCE}$ CCEs in a given subframe. As shown in FIG. 2, the common search space may start at logical CCE n=0, i.e. the first logical CCE of the control region (where the exact REs may depend on the mapping of the particular subframe), and may occupy CCEs n=0, . . . , 15. The CCEs may additionally contain one or more UE-specific search spaces (one per mobile terminal), where an LTE cell may select the starting CCE index for the UE-specific search space for each mobile terminal based on a random hash function; accordingly, each UE-specific search space may occupy a contiguous block of CCEs beginning with the respective starting CCE index. As shown in FIG. 2, a UE-specific search space may overlap with the common search space, as the depicted UE-specific search space also has a starting CCE index of n=0; additionally, UE-specific search spaces may overlap with one another.

Accordingly, depending on which type(s) of PDCCH messages a mobile terminal is expecting, the mobile terminal may search through the CCEs one or both of the search spaces in order to identify and read any PDCCH messages that are addressed to the mobile terminal. The transmitting LTE cell may consequently need to address each of the PDCCH messages in order to allow the receiving mobile terminals to establish whether a given PDCCH message is intended for it or not. As specified by the 3GPP, LTE cells may append a Cyclic Redundancy Check (CRC) to each PDCCH message that depends on an identification value, where each identification value specifies an individual or group of mobile terminals. More specifically, each mobile terminal may be assigned one or more network identifiers known as Radio Network Temporary Identifiers (RNTI). RNTIs of particular importance include Cell-RNTIs (C-RNTI), which a cell may individually assign to each connected mobile terminal in order to uniquely identify each connected mobile terminal, Paging-RNTIs (P-RNTIs), which a cell may utilize to page mobile terminals, System Information-RNTIs (SI-RNTIs), which a cell may use to schedule system information messages, etc. Accordingly, depending on the type and intended recipients of each PDCCH message, an LTE cell may append an appropriate CRC to each PDCCH message that corresponds to the RNTI of the intended recipients.

Depending on its current operating status, a given mobile terminal may be assigned multiple different RNTIs and accordingly may need to check the search spaces for PDCCH messages addressed with more than one RNTI. During search of the common and/or UE-specific search spaces, a mobile terminal may thus need to identify each possible block of CCEs that could contain a PDCCH message addressed to the mobile terminal and attempt to decode each possible CCE block. Upon completing the decode of a given CCE block, the mobile terminal may compare the CRC with the RNTIs associated with the mobile terminal and determine whether the CCE block contains a PDCCH message addressed to the mobile terminal based on whether the CRC matches any of the associated RNTIs. Mobile terminals may proceed to check each possible block of CCEs in the search space and thus identify all relevant PDCCH messages.

Each possible block of CCEs that could contain a PDCCH message for a given mobile terminal may thus be referred to as a PDCCH candidate. FIG. 2 depicts various PDCCH candidates in both the common and UE-specific search space, which may have varying aggregation levels L; in other words, each PDCCH candidate may be composed of L logically consecutive CCEs where L may vary. The exact CCE locations of each PDCCH candidate may be specified by the 3GPP; accordingly, upon identifying the common search space (CCE index n=0) and the UE-specific search space (with a starting CCE index dependent on the random hash function), a mobile terminal may need to search through each PDCCH candidate and determine which (if any) PDCCH candidates are addressed to the mobile terminal by comparing the CRC of each decoded PDCCH candidate to the associated RNTIs. As L and the starting CCE position of each PDCCH candidate may vary, a mobile terminal may have to search across multiple different blocks of CCEs in order to reliably detect PDCCH messages.

The aggregation level used by an LTE cell for each PDCCH message may vary depending on several factors. As noted above, certain DCI formats may need to contain more data in order to detail control information for complex transmissions such as MIMO. While most of the DCI formats specified by the 3GPP will fit into the 72 bit capacity of a single CCE, some DCI formats, such as for the aforementioned case of MIMO, may contain over 72 payload bits and thus may require more than one CCE. Additionally, LTE cells may select aggregation levels based on the current radio conditions of the target mobile terminals. As PDCCH messages are essential to maintaining both uplink and downlink communications, LTE cells may need to ensure that target mobile terminals are able to reliably receive and decode PDCCH messages. In order to ensure decoding, LTE cells may utilize higher aggregation levels for mobile terminals in poor radio conditions and accordingly may transmit these PDCCH messages with more coding bits. As a result, the target mobile terminals may enjoy coding and/or energy gains in decoding and be able to accurately decode PDCCH messages despite poor radio conditions. As other mobile terminals in superior radio conditions may be able to decode the PDCCH messages without such coding and energy gains, LTE cells may utilize lower aggregation levels for PDCCH messages addressed to these mobile terminals. Furthermore, LTE cells may select to utilize higher aggregation levels when only a small number of mobile terminals are being serviced, as such may allow for more CCEs to be allocated per user and thus provide improved decoding performance. Conversely, when a large number of mobile terminals are being served by a cell, the limited per-user control resources may result in the cell needing to utilize smaller aggregation levels.

When searching through the search space for PDCCH messages, a mobile terminal may not know specifically which aggregation level the cell used to transmit a PDCCH message of interest. As a result, mobile terminals may need to search PDCCH candidates of all possible aggregation levels in order to detect PDCCH messages, where some of the PDCCH candidates overlap in CCEs with one another due to the varying lengths. As specified by the 3GPP, PDCCH messages in the common search space may utilize an aggregation level of either L=4 or L=8 while PDCCH messages in UE-specific search spaces may use any of the possible L=1,2,4,8 aggregation levels. Accordingly, a mobile terminal may need to search L=4 and L=8 PDCCH candidates in the common search space and L=1,2,4,8 candidates in the UE-specific search space (as shown in FIG. 2). While the 3GPP has also specified certain CCE indices that PDCCH messages of specific aggregation levels can be located (e.g., L=1 PDCCH messages may only be located at certain CCE indices and so forth for L=2,4,8), as shown in FIG. 2 the PDCCH candidates may overlap in CCE index.

Mobile terminals may therefore need to perform blind decodes over a number of PDCCH candidates of varying aggregation levels in order to search for PDCCH messages. Furthermore, in many cases a mobile terminal may not know specifically which DCI Format an expected PDCCH message will be. For example, as specified by the 3GPP in Table 7.1-5 of TS 36.213 "Evolved Universal Terrestrial Radio Access (E-UTRA) Physical layer procedures", V13.1.1 (Release 13), each mobile terminal configured with a given Transmission Mode (TM) may be eligible to receive two different DCI Formats. More specifically, the LTE cell may configure each mobile terminal according to a particular transmission mode, where each transmission mode may call for a different transmission configuration such as standard single antenna communication, transmit diversity, cyclic delay diversity, single/multi-user MIMO, beamforming, coordinated multi-point, etc. As shown in Table 7.1-5, each transmission mode may allow for two different DCI Formats; as a result, a mobile terminal that has been configured to a particular transmission mode may be eligible to receive either of the two corresponding DCI Formats as the PDCCH message. As each DCI Format requires a different amount of payload data, and thus is encoded differently depending on the payload data size, a mobile terminal that is expecting a PDCCH message may need to decode each PDCCH candidate according to both eligible DCI Formats. As opposed to decoding each PDCCH candidate a single time, a mobile terminal may thus need to perform two separate decodes where each decode utilizes a different decoding assumption on account of the different possible DCI Formats. In other words, a mobile terminal may decode a given PDCCH candidate a first time assuming the PDCCH candidate is the first eligible DCI Format and, if this decode fails, may decode the same PDCCH candidate a second time assuming the PDCCH candidate is the second eligible DCI Format.

The extensive blind decoding over a large number of PDCCH candidates combined with the need to perform multiple decodes of each PDCCH candidate may thus require considerable time and high power consumption. In an advantageous solution of this disclosure, a mobile terminal may take exploit the rate-matching procedure used by LTE cells to encode PDCCH messages in order to substantially reduce the amount of decoding in the blind decode process to both save time and power. In particular, a mobile terminal may determine whether the mobile terminal is currently in strong radio conditions and, if so, perform blind decoding of PDCCH candidates assuming a reduced aggregation level and may thus perform blind decoding on smaller blocks of data for each PDCCH candidate. Accordingly, as opposed to decoding each PDCCH candidate over the corresponding full aggregation level (i.e. over all of the CCEs assigned to the PDCCH candidate), the mobile terminal may decode certain PDCCH candidates with a reduced aggregation level by only decoding part of the encoded data of the PDCCH candidate (i.e. only decoding some of the CCEs assigned to the PDCCH candidate). As LTE cells may encoded PDCCH with redundancy (to provide coding and/or energy gains at higher aggregation levels), the mobile terminal may be able to reliably decode the PDCCH candidates with lower aggregation levels and thus conserve time and power in the decoding process. While the mobile terminal may sacrifice coding and/or energy gain by ignoring some of the CCEs during decoding, given strong radio conditions the mobile terminal may still enjoy sufficient decoder performance.

Figure 3:
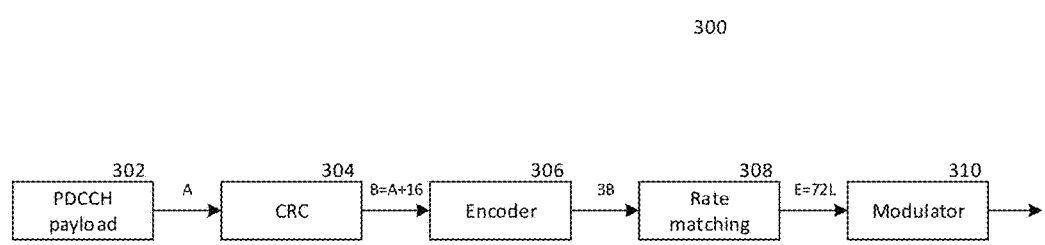
FIG. 3 shows downlink encoding circuitry for an LTE cell.

As noted above, the possibility of this solution may stem from the rate-matching scheme employed by LTE cells during PDCCH encoding. FIG. 3 shows an exemplary encoding circuitry 300 for PDCCH data which may be included in an LTE cell (e.g. at a Baseband Unit (BBU) of an LTE eNodeB) As shown in FIG. 3, an LTE cell may start with the PDCCH payload data of A bits at 302, which as detailed in Section 5.3.3 of 3GPP TS 36.212 "Evolved Universal Terrestrial Radio Access (E-UTRA); Multiplexing and channel coding" V13.1.0 (Release 13), may vary depending on the DCI format, e.g. low complexity DCI formats such as single-antenna transmission have less payload data than complex DCI formats such as MIMO transmission, and on system bandwidth (with larger system bandwidth settings needing larger payload size). The LTE cell may then append a 16-bit CRC to the payload data to obtain a B=A+16 bit unencoded sequence with CRC circuit 304, where as previously detailed the LTE cell may derive the CRC based on the RNTI of the destination mobile terminal. The LTE cell may then encode the B bit unencoded sequence at encoder 306, which may be a 1/3 rate convolutional encoder as specified by the 3GPP. Accordingly, given the 1/3 rate encoder 306 may produce 3B bits in the form of three separate bitstreams each of length B, where each bitstream corresponds to a respective encoded bit position. Due to the bit capacity constraints placed by the aggregation level L, the LTE cell may then need to perform rate matching at rate matching circuit 308 to obtain an E=72L bit sequence (where each CCE contains 72 bits) from the 3B bits of the encoded bit sequence.

The advantageous solution of this disclosure may exploit the rate-matching procedure employed by LTE cells to obtain the E bit encoded sequence. In order to ensure that the encoded sequence can be completely decoded by a destination mobile terminal, rate matching circuit 308 may need to ensure that each of the original B bits (of which A are payload data and 16 are CRC bits) is represented by at least one bit of the E-bit encoded sequence; otherwise, the mobile terminal will not have enough information to decode all of the bits. Accordingly, E must be at least B, i.e. E≥B, which may require the LTE cell to utilize an aggregation level L sufficient to fit at least B bits into the E=72L bits of the rate-matched sequence. As previously noted, most DCI formats will be able to fit into a single CCE, i.e. B≤72; however, some DCI formats may be larger and thus may require a minimum aggregation level of L=2.

Depending on the aggregation level L and original sequence length B, rate matching circuit 308 may either need to employ puncturing or bit replication in order to produce an E length sequence. For example, if not all of the 3B bits encoded bits will fit into the E total bits of the L aggregated CCEs, rate matching circuit 308 may need to discard, or 'puncture' some of the encoded bits to arrive at E bits that will fit into the L aggregated CCEs; conversely, if more than the 3B bits will fit into the E total bits of the L aggregated CCEs, rate matching circuit 308 may duplicate some of the encoded bits to produce E bits to place into the L aggregated CCEs.

As specified by the 3GPP, encoder 306 may generate the 3B bit sequence by generating the aforementioned three bitstreams each of length 3: $b_0(k)$, $b_1(k)$, and $b_2(k)$ for k=0, 1, . . . , B-1. Encoder 306 may then generate the 3B bit encoded sequence $b_{enc}(k)$, k=0, 1, . . . , 3B-1 by placing $b_0(k)$ as the first B bits of $b_{enc}(k)$, $b_1(k)$ as next B bits of $b_{enc}(k)$, and $b_2(k)$ for the remaining B bits of $b_{enc}(k)$, i.e.

$$b_{enc}(k)=[b_0(0) \ldots b_0(B-1)b_1(0) \ldots b_1(B-1) \quad (1)$$
$$b_2(0) \ldots b_2(B-1)]$$

As previously noted, there must be at least one encoded bit of $b_{enc}(k)$ that corresponds to each unencoded bit of the original B bit sequence in order to allow a mobile terminal to fully recover the original sequence, i.e. one coding bit corresponding to each of the original B bits. The presence of multiple coding bits, e.g. if two or more of $b_0(0)$, $b_1(0)$, and $b_2(0)$ are present for bit position k=0 of the original sequence, may offer coding gains for bit k=0 during decoding by a mobile terminal; additionally, the presence of duplicated bits, e.g. if $b_0(0)$ is duplicated in the encoded sequence, such may offer energy gains during decoding as a mobile terminal may combine the received bits. While only the first B bits of $b_{enc}(k)$ are theoretically needed to decode, multiple coding bits and duplicated bits may be needed for mobile terminals in poor radio conditions to reliably decode the encoded sequence.

Rate matching circuit 308 may need to puncture or replicate encoded bit sequence $b_{enc}(k)$ to arrive at a rate matched sequence $b_{rm}(k)$, k=0, 1, . . . , E-1 (where some puncturing may be required in every case that E is not an integer multiple of 3B). Accordingly, if 3B>E, i.e. not all of the 3B bits of $b_{enc}(k)$ will fit into the E total bits of the L aggregated CCEs, rate matching circuit 308 may simply perform burst puncturing and drop the 3B-E last bits of $b_{enc}(k)$, thus producing the rate-matched sequence $b_{rm}(k)$ as the first E bits of $b_{enc}(k)$, i.e.

$$b_{rm}(k)=b_{enc}(k), k=0, 1, \ldots E-1 \quad (2)$$

Rate matching circuit 308 may then pass the resulting E bit rate-matched sequence $b_{rm}(k)$ to modulator 310 for modulation and transmission. Accordingly, $b_{rm}(k)$ may contain multiple encoded bits corresponding to certain bit positions of the unencoded sequence (assuming E≠3B) and may thus offer a coding gain for certain bit positions; however, as less than the 3B bits were transmitted there may only be coding gains at some bit positions and no energy gain (as no encoded bits were replicated).

The condition 3B>E may only be feasible if the destination mobile terminal is in strong radio conditions, as it may be difficult for mobile terminals to reliably decode the rate-matched sequence $b_{rm}(k)$ with only partial coding gains and no energy gains in the face of noise and interference. Accordingly, for mobile terminals experiencing poor radio conditions, the LTE cell may select a larger aggregation level L which may as a result allow for more of the 3B encoded bits of $b_{enc}(k)$ to be passed by rate matching circuit 308 to $b_{rm}(k)$. For example, if E≥3B, i.e. if at least the 3B bits of $b_{enc}(k)$ will fit in the L total aggregated CCEs, rate matching circuit 308 may be able to pass the complete 3B bits of $b_{enc}(k)$ to $b_{rm}(k)$, thus offering coding gains for every bit. Furthermore, if E>3B, i.e. if more than the 3B bits of $b_{enc}(k)$ will fit into the L aggregated CCEs, rate matching circuit 308 may additionally be able to duplicate some of the 3B bits to fill the remaining E-3B bit positions of the L aggregated CCEs, thus offering an energy gain at the duplicated bit positions as a decoder may be able to combine multiple bits together. If $b_{rm}(k)$ is e.g. double or triple the size of $b_{enc}(k)$, i.e. if $b_{enc}(k)$ fits multiple times within $b_{rm}(k)$, rating matching circuit 308 may be able to duplicate $b_{enc}(k)$ several times over, thus offering substantial energy gain. As specified by the 3GPP, depending on the payload size A and aggregation level L, it may be possible for rate matching circuit 308 to produce e.g. an 18B bit encoded sequence, thus replicating $b_{enc}(k)$ six times over in the rate-matched sequence $b_{rm}(k)$. In all such cases, rate matching circuit 308 may still need to perform burst puncturing (unless E is an exact multiple of 3B) in order to produce an rate-matched sequence $b_{rm}(k)$ of exactly E bits.

Accordingly, the LTE cell may be able to select aggregation levels to provide coding and energy gains to ensure that destination mobile terminals are able to reliably decode each PDCCH message. Nevertheless, as rate matching circuit 308 will always include $b_0(k)$ as the first B bits the rate-matched bit sequence $b_{rm}(k)$ (as $b_0(k)$ will occupy the first B bits of $b_{enc}(k)$), mobile terminals may still have enough information to decode a given PDCCH message from only the first B bits of the encoded output sequence. For example, if e.g. B=70 and L=2, rate matching circuit 308 may produce an E=144 bit rate-matched sequence $b_{rm}(k)$ in which the first 70 bits of $b_{rm}(k)$ are $b_0(k)$ and the remaining 74 bits are the 70 bits of b(k) and the first 4 bits of $b_2(k)$. If radio conditions are strong enough, a mobile terminal may theoretically not need the coding gain offered by the final 74 bits and may be able to recover the original 70 bit sequence by only decoding $b_0(k)$, i.e. the first 70 bits of rate-matched sequence $b_{rm}(k)$. Accordingly, even though two CCEs were used to transmit $b_{rm}(k)$, the mobile terminal may only need to decode the first CCE, i.e. the first 72 bits of $b_{rm}(k)$ in order to recover the original B bit sequence. Alternatively, the mobile terminal may determine that SNR conditions are good enough that e.g. two CCEs of data (e.g. 144 bits of the rate-matched sequence $b_{rm}(k)$) would be sufficient to reliably decode the original PDCCH message. Accordingly, the mobile terminal may decode each L=2,4,8 PDCCH candidate with only two CCEs, i.e. may input only two CCEs of each PDCCH candidate to the decoder for decoding. While explained here with an integer multiple of CCEs, the mobile terminal may instead input only partial CCEs to the decoder, such as e.g. only inputting the first B bits of the first CCE (if E>B) into the decoder. Such examples may be similarly extended to any number of scenarios with B, L, and E.

Accordingly, in order to conserve time and power, a mobile terminal may determine when radio conditions are strong and subsequently decode PDCCH candidates with a lower assumed aggregation level, i.e. by decoding less than all of the CCEs assigned to the PDCCH candidates. For example, the mobile terminal may perform a Signal to Noise Ratio (SNR) measurement and determine that radio conditions are strong enough that only one CCE is needed to decode PDCCH messages. Accordingly, the mobile terminal may decode each PDCCH candidate, regardless of aggregation level, with only one CCE. Accordingly, as decoding of further CCEs will produce coding and energy gains but are not absolutely necessary if radio conditions are sufficient, the mobile terminal may conserve time and power by decoding less information than in the conventional case.

Figure 4:
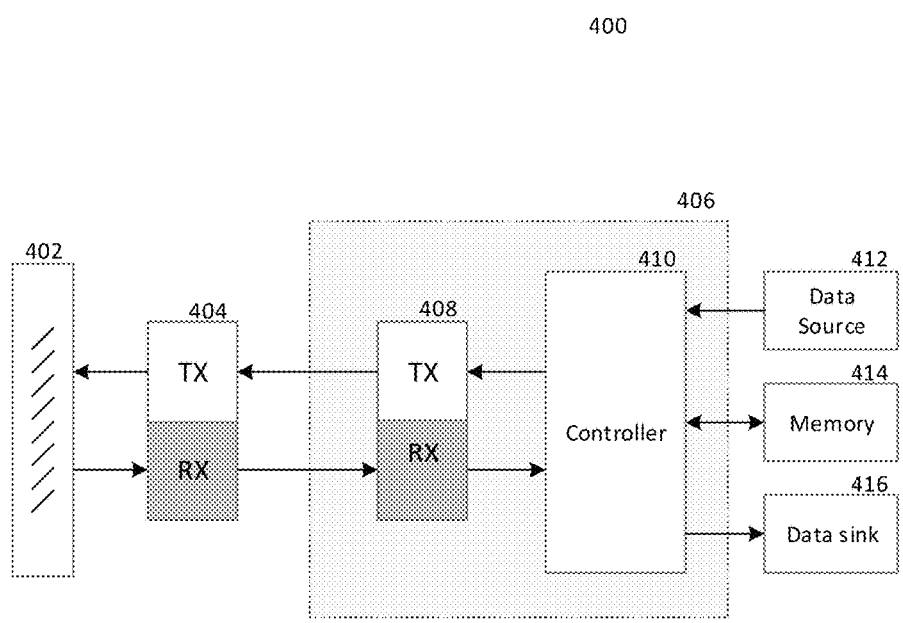
FIG. 4 shows an internal configuration of a mobile terminal.

FIG. 4 shows an internal configuration of mobile terminal 400, which may include antenna system 402, radio frequency (RF) transceiver 404, baseband modem 406 (including physical layer processing circuit 408 and controller 410), data source 412, memory 414, and data sink 416. As will be detailed, mobile terminal 400 may be configured to perform PDCCH decoding by determining if a reduced decoding aggregation level is acceptable based on radio measurements and, if yes, decode the PDCCH candidates with the reduced decoding aggregation level, i.e. decode less than all of the CCEs assigned to the PDCCH candidates. As certain encoded bits will be redundant, mobile terminal 400 may theoretically not need to decode all of the CCEs and may conserve time and power at the expense of coding and/or energy gains by decoding only part of the CCEs of the PDCCH candidates. Although not explicitly shown in FIG. 4, mobile terminal 400 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, mobile terminal 400 may transmit and receive radio signals on one or more radio access networks. Baseband modem 406 may direct such communication functionality of mobile terminal 400 according to the communication protocols associated with each radio access network, and may execute control over antenna system 402 and RF transceiver 404 in order to transmit and receive radio signals according to the formatting and scheduling parameters defined by each communication protocol.

Mobile terminal 400 may transmit and receive radio signals with antenna system 400, which may be a single antenna or an antenna array composed of multiple antennas and may additionally include analog antenna combination and/or beamforming circuitry. In the receive path (RX), RF transceiver 404 may receive analog radio frequency signals from antenna system 402 and perform analog and digital RF front-end processing on the analog radio frequency signals to produce digital baseband samples (e.g. In-Phase/Quadrature (IQ) samples) to provide to baseband modem 404. RF transceiver 404 may accordingly include analog and digital reception circuitry including amplifiers (e.g. a Low Noise Amplifier (LNA), filters, RF demodulators (e.g. an RF IQ demodulator)), and analog-to-digital converters (ADCs) to convert the received radio frequency signals to digital baseband samples. In the transmit path (TX), RF transceiver 404 may receive digital baseband samples from baseband modem 206 and perform analog and digital RF front-end processing on the digital baseband samples to produce analog radio frequency signals to provide to antenna system 402 for wireless transmission. RF transceiver 404 may thus include analog and digital transmission circuitry including amplifiers (e.g. a Power Amplifier (PA), filters, RF modulators (e.g. an RF IQ modulator), and digital-to-analog converters (DACs) to mix the digital baseband samples received from baseband modem 406 to produce the analog radio frequency signals for wireless transmission by antenna system 402. Baseband circuit 406 may control the RF transmission and reception of RF transceiver 404, including specifying the transmit and receive radio frequencies for operation of RF transceiver 404.

As shown in FIG. 4, baseband modem 406 may include physical layer processing circuit 408, which may perform physical layer (Layer 1) transmission and reception processing to prepare outgoing transmit data provided by controller 410 for transmission via RF transceiver 404 and prepare incoming received data provided by RF transceiver 404 for processing by controller 410. Physical layer processing circuit 410 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing circuit 408 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 4, physical layer processing circuit 408 may include a control circuit such as a processor configured to control the various hardware and software processing components of physical layer processing circuit 408 in accordance with physical layer control logic defined by the communications protocol for the relevant radio access technologies. Furthermore, while physical layer processing circuit 408 is depicted as a single component in FIG. 4, physical layer processing circuit 408 may be collectively composed separate sections of physical layer processing circuitry where each respective section is dedicated to the physical layer processing of a particular radio access technology.

Mobile terminal 400 may be configured to operate according to one or more radio access technologies, which may be directed by controller 410. Controller 410 may thus be responsible for controlling the radio communication components of mobile terminal 400 (antenna system 402, RF transceiver 404, and physical layer processing circuit 408) in accordance with the communication protocols of each supported radio access technology, and accordingly may represent the Access Stratum and Non-Access Stratum (NAS) (also encompassing Layer 2 and Layer 3) of each supported radio access technology. Controller 410 may be structurally embodied as a protocol processor configured to execute protocol software (retrieved from controller memory MEM as shown in FIG. 4) and subsequently control the radio communication components of mobile terminal 400 in order to transmit and receive communication signals in accordance with the corresponding protocol control logic defined in the protocol software.

Controller 410 may therefore be configured to manage the radio communication functionality of mobile terminal 400 in order to communicate with the various radio and core network components of radio communication network 100, and accordingly may be configured according to the communication protocols for both the LTE network and the GSM/UMTS legacy network. Controller 410 may either be a unified controller that is collectively responsible for all supported radio access technologies (e.g. LTE and GSM/UMTS) or may be composed of multiple separate controllers where each controller is a dedicated controller for a particular radio access technology, such as e.g. a dedicated LTE controller and a dedicated legacy controller (or alternatively a dedicated LTE controller, dedicated GSM controller, and a dedicated UMTS controller). Regardless, controller 410 may be responsible for directing radio communication activity of mobile terminal 400 according to the communication protocols of the LTE and legacy networks. As previously noted regarding physical layer processing circuit 408, one or both of antenna system 402 and RF transceiver 404 may similarly be partitioned into multiple dedicated components that each respectively correspond to one or more of the supported radio access technologies. Depending on the specifics of each such configuration and the number of supported radio access technologies, controller 410 may be configured to control the radio communication operations of mobile terminal 400 in accordance with a master/slave RAT hierarchical or multi-SIM scheme.

Mobile terminal 400 may further comprise data source 412, memory 414, and data sink 416, where data source 412 may include sources of communication data above controller 410 (i.e. above the NAS/Layer 3) and data sink 412 may include destinations of communication data above controller 410 (i.e. above the NAS/Layer 3). Such may include, for example, an application processor of mobile terminal 400, which may be configured to execute various applications and/or programs of mobile terminal 400 at an application layer of mobile terminal 400, such as e.g. an Operating System (OS), a User Interface (UI) for supporting user interaction with mobile terminal 400, and/or various user applications. The application processor may interface with baseband modem 406 (as data source 412/data sink 416) as an application layer to transmit and receive user data such as voice data, audio/video/image data, messaging data, application data, basic Internet/web access data, etc., over a the radio network connection(s) provided by baseband modem 406. Data source 412 and data sink 416 may additionally represent various user input/output devices of communication device 400, such as display(s), keypad(s), touchscreen(s), speaker(s), external button(s), camera(s), microphone(s), etc., which may allow a user of mobile terminal 400 to control various communication functions of mobile terminal 400 associated with user data.

Memory 414 may embody a memory component of mobile terminal 400, such as e.g. a hard drive or another such permanent memory device. Although not explicitly depicted in FIG. 4, the various other components of mobile terminal 400 shown in FIG. 4 may additionally each include integrated permanent and non-permanent memory components, such as for storing software program code, buffering data, etc.

As introduced above, mobile terminal 400 may perform PDCCH decoding by, if radio conditions are determined to be strong, assuming a reduced aggregation level during decoding and thus decoding PDCCH candidates with less CCEs the PDCCH candidates actually include (either as an integer number of CCEs or partial CCEs, i.e. inputting an integer number of CCEs into the decoder or inputting partial bits of CCEs into the decoder). Accordingly, if mobile terminal 400 determines that radio conditions are strong enough that one CCE is sufficient to reliably decode PDCCH data, mobile terminal 400 may only decode one CCE worth of data for each PDCCH candidate, thus conserving time and power while sacrificing coding and energy gains that may be available if all CCEs of the PDCCH candidates are decode. Similarly, if mobile terminal 400 determines that radio conditions are strong enough that two CCEs are sufficient to reliably decode PDCCH data, mobile terminal 400 may decode two CCEs worth of data for each L=2,4,8 PDCCH candidate. As the LTE cell may nevertheless have transmitted a PDCCH message with L=1, mobile terminal 400 may still need to decode only one CCE for each L=1 candidate.

Figure 5:
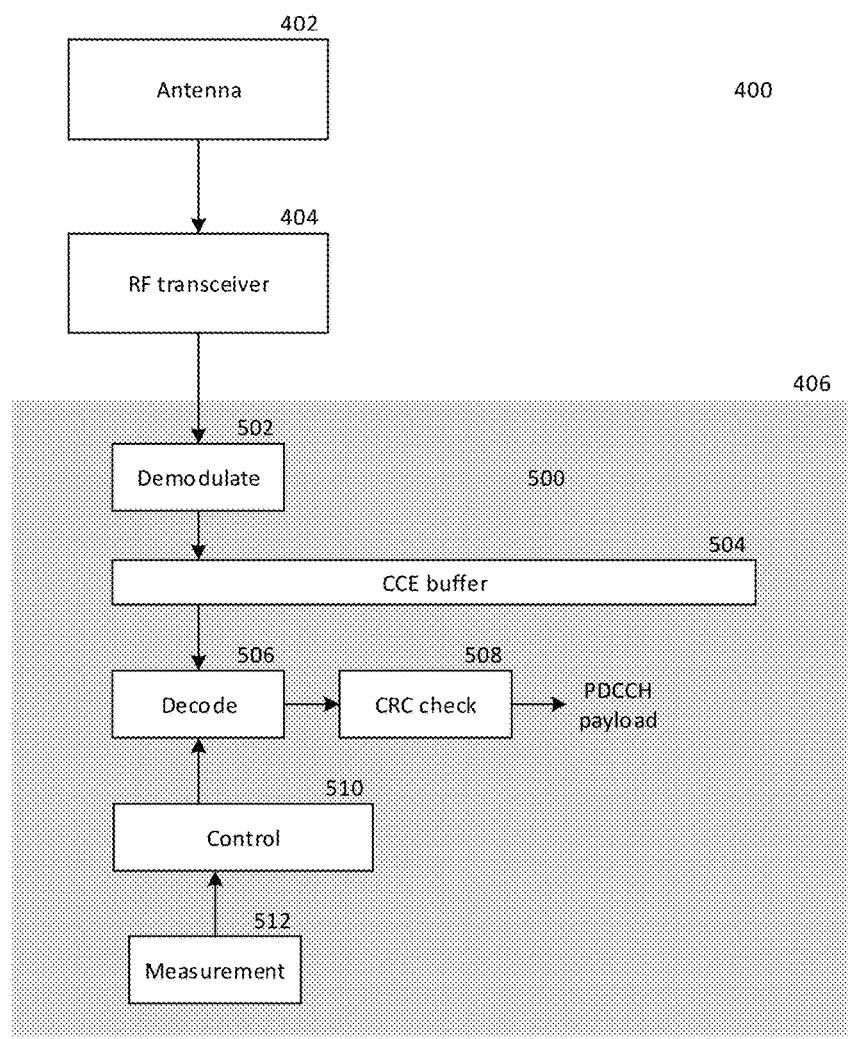
FIG. 5 shows a decoding structure of a mobile terminal.
Figure 6:
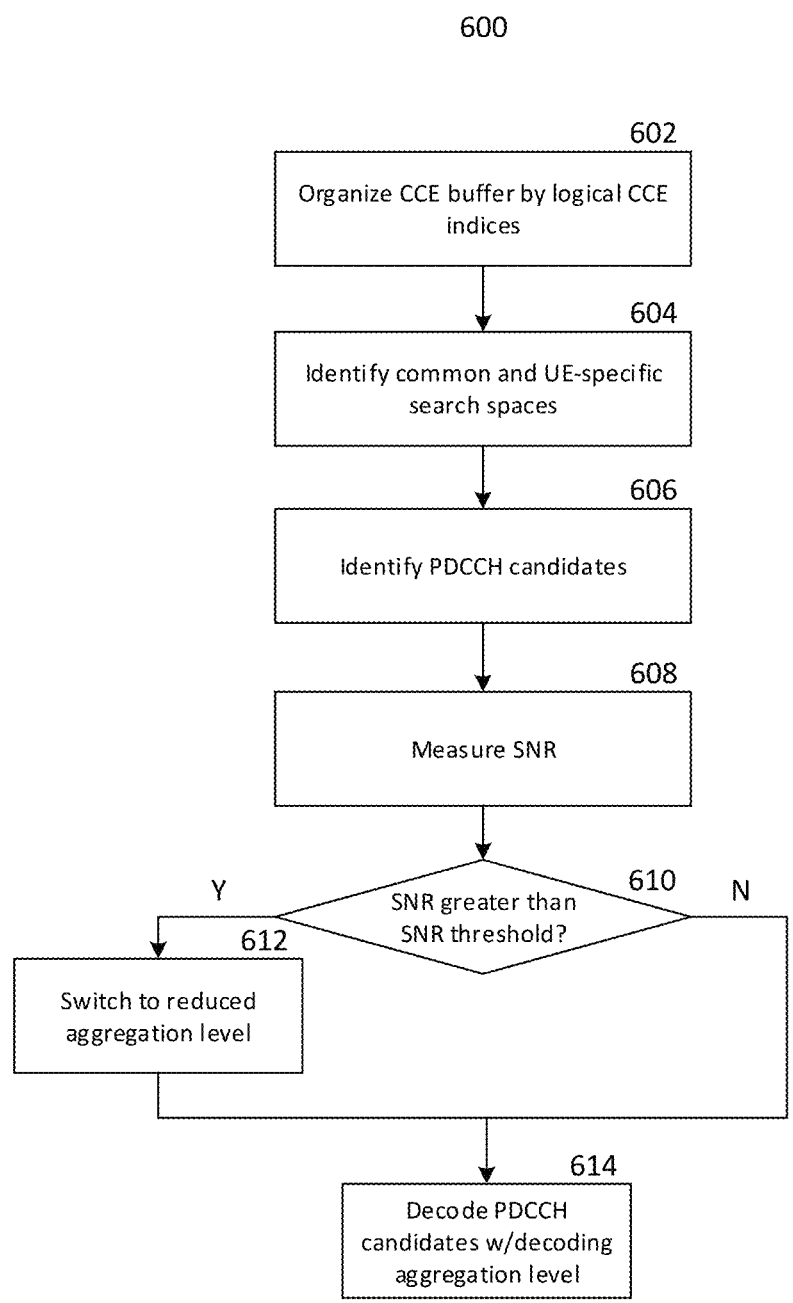
FIG. 6 shows a method of performing PDCCH searches.

FIG. 5 shows the internal structure of mobile terminal 400 related to the PDCCH decoding procedure of this disclosure, where other internal components of mobile terminal 400 in addition to control, clock, and power lines are not explicitly shown in order to preserve drawing clarity. FIG. 6 shows method 600, which details the PDCCH decoding process performed by decoding structure 500 of baseband modem 406 as shown in FIG. 5. The functionality of each component of decoding structure 500 may be structurally realized/embodied as hardware logic, e.g. as one or more integrated circuits or FPGAs, as software logic, e.g. as one or more processors executing program code that defining arithmetic, control, and I/O instructions stored in a non-transitory computer-readable storage medium, or as a combination of hardware and software logic. Although not explicitly limited to such, decoding structure 500 may be included in e.g. physical layer processing circuit 408 of baseband modem 406. As will be detailed, detection structure 500 may be characterized as a circuit arrangement including a control circuit (e.g. control circuit 510) configured to identify a candidate message in received control data that indicates a potential location of an encoded message in the received control data, the candidate message having a predefined message bit length, a measurement circuit (e.g. measurement circuit 512) configured to perform a radio measurement, the control circuit further configured to compare the radio measurement to a predefined threshold, and a decoding circuit (e.g. decoding circuit 506) further configured to, if the radio measurement satisfies the predefined threshold, search for the encoded message in the received control data by decoding the candidate message from the received control data with a reduced message bit length less than the predefined bit length. In an alternative characterization, detection structure 500 may be characterized as circuit arrangement including a control circuit (e.g. control circuit 510) configured to identify a Physical Downlink Control Channel (PDCCH) candidate in received PDCCH data, the PDCCH candidate composed of a block of encoded bits in the received PDCCH data that occupies a potential location of a PDCCH message in the received PDCCH data, a measurement circuit (e.g. measurement circuit 512) configured to perform a radio measurement, the control circuit configured to compare the radio measurement to a predefined threshold, and a decoding circuit (e.g. decoding circuit 506) configured to, if the radio measurement satisfies the predefined threshold, search for the PDCCH message in the received PDCCH data by decoding a lesser subset of the block of encoded bits of the PDCCH candidate.

As shown in FIG. 5, antenna system 402 may provide radio frequency signals to RF transceiver 404, which may perform RF demodulation and ADC conversion to produce baseband samples (IQ data) to provide to baseband modem 406. In addition to other preprocessing operations, baseband modem 406 may demodulate the baseband samples to produce CCE buffer 504, which may contain the encoded bits from the CCEs of the control region of the current subframe.

As previously detailed, the CCEs may be mapped to specific non-reference symbol REs of the control region; accordingly, in 604 CCE buffer 504 may de-map the CCE bits and organize the CCE bits ($N_{CCE} \cdot 72$ in total) according to the logical CCE indices ranging from 0 to $N_{CCE}-1$ as detailed above regarding FIG. 2. Mobile terminal 400 may need to search through the CCEs of the current subframe in order to identify which blocks of CCEs, i.e. PDCCH candidates, contain PDCCH messages addressed to mobile terminal 400. As noted above, the CCEs may be arranged into a common search space and one or more UE-specific search spaces. Control circuit 510 may thus be configured to identify the common search space and the UE-specific search space of the CCEs contained in CCE buffer 504 in 604, where the common search space starts at CCE n=0 and the UE-specific search space has a starting CCE depending on the hash function applied by the transmitting LTE cell. Control circuit 510 may thus identify the starting CCE of the UE-specific search space based on the hash function in 604.

By identifying the common and UE-specific search spaces in 604, control circuit 510 may identify which CCEs need to be searched for PDCCH messages. Control circuit 510 may then identify the PDCCH candidates, which may include the PDCCH candidates of both the common search space and the UE-specific search space for mobile terminal 400. As previously detailed regarding FIG. 2, each PDCCH candidate may start at a particular CCE index and be any one of L=1,2,4,8 CCEs in length, and only PDCCH messages of certain aggregation levels may be located at specific CCE indices. Control circuit 510 may identify the PDCCH candidates based on these definitions. For example, regarding the exemplary scenario of FIG. 2 control circuit 510 may identify 6 PDCCH candidates in the common search space and 16 PDCCH candidates in the UE-specific search space, where each PDCCH candidate has a specific aggregation level and starting CCE index location. Each PDCCH candidate may thus be an 72L block of bits stored in CCE buffer 504, where as previously detailed the PDCCH candidates may overlap with one another (as shown in the exemplary case of FIG. 2).

In a conventional decoding scenario, mobile terminal 400 may search through the PDCCH candidates by decoding each PDCCH candidate according to the corresponding aggregation level, i.e. decoding the bits of the CCEs corresponding to each PDCCH candidate, according to the expected DCI Formats and checking whether the decode was successful or not by comparing the post-decode CRC bits to the RNTIs assigned to mobile terminal 400. If the CRC bits match an assigned RNTI, mobile terminal 400 may identify the PDCCH message as being addressed to mobile terminal 400 (either uniquely or as a group-level PDCCH message) and keep the decoded bits to reconstruct the associated DCI Format; if not, mobile terminal 400 may determine that the PDCCH message was not addressed to mobile terminal 400 and discard the decoded bits. As previously noted, PDCCH messages addressed to mobile terminal 400 may be eligible to be any of multiple different DCI Formats depending on the TM mode with which mobile terminal 400 is currently configured; accordingly, mobile terminal 400 may need to perform each decode multiple times using the differing DCI Formats corresponding to the current TM mode configuration.

In such conventional decoding, mobile terminal 400 may feed the bits of all CCEs of a given PDCCH candidate to the decoder; accordingly, the decoder may decode 8 CCEs for aggregation level L=8 PDCCH candidates, 4 CCEs for aggregation level L=4 PDCCH candidates, 2 CCEs for aggregation level L=2 PDCCH candidates, and 1 CCE for aggregation level L=1 PDCCH candidates. Even though most PDCCH messages may at fit into the E=72 bits of a single CCE (while some may require E=144 bits of two CCEs), the LTE cell may utilize higher aggregation levels in order to allow mobile terminals to more reliably decode PDCCH messages even in the presence of noise and interference. However, due to the burst-puncturing used in the rate-matching scheme for LTE cells (as detailed above regarding rate matching circuit 308), a mobile terminal may theoretically be able to decode each PDCCH message using only the first B bits of the PDCCH message (e.g. the first encoded stream $b_0(k)$); accordingly, while the remaining 2B bits and any replicated bits (for E>3B) may be useful during decoding for coding and energy gains, these redundant bits may not be an absolute requirement for successful decoding.

Accordingly, if radio conditions are sufficient, mobile terminal 400 may decide to only utilize part of each PDCCH candidate for decoding. More specifically, mobile terminal 400 may identify the minimum aggregation level, i.e. the minimum number of CCEs, that could be utilized for decoding given the current radio conditions and subsequently decode the PDCCH candidates using the selected minimum aggregation level instead of the actual aggregation level of each PDCCH candidate. Alternatively to utilizing an integer number of CCEs, mobile terminal 400 may equivalently identify the minimum number of encoded bits of the CCEs that are needed for decoding and input only these bits into the decoder, i.e. may decode a fractional number of CCEs).

Measurement circuit 512 may therefore perform a radio measurement in 608 in order to evaluate the current radio conditions of mobile terminal 400. Although not explicitly shown in FIG. 5, measurement circuit 512 may perform the radio measurement with data provided by RF transceiver 404, i.e. baseband IQ samples, or by demodulation circuit 502, i.e. binary soft bits, which may or may not be same data as stored in CCE buffer 504. Measurement circuit 512 may then provide the radio measurement to control circuit 510 for evaluation in 610 where control circuit 510 may determine whether the radio measurement indicates that radio conditions are sufficient to perform decoding with a lower aggregation level.

The radio measurement may thus need to indicate expected decoding success. Accordingly, various different types of measurement may be available to measurement circuit 512 and control circuit 510, including SNR measurements, average soft bit magnitude, and Reference Signal Receive Quality (RSRQ). For example, measurement circuit 512 may perform an SNR measurement in 608, which may indicate the signal power over the noise power and thus provide a quantitative indication of the current radio conditions. Alternatively, measurement circuit 512 may evaluate the soft-bits provided by demodulation circuit 502, where demodulation circuit 502 may perform a modulation demapping in order to convert IQ modulation symbols into soft bits (such as e.g. a Log Likelihood Ratio (LLR)) according to the particular modulation scheme. The resulting soft bits may range over a positive and negative range, such as e.g. −127 to 127 for an 8-bit soft bit scheme, where the sign of the soft bit indicates a logical "0" or "1" and the magnitude of the soft bit indicates the strength of the sign. Accordingly, soft bits with high magnitudes may indicate a high confidence in the bit signs while soft bits with low magnitudes may indicate low confidence in the bit signs. As high-magnitude soft bits may produce better decoding success due to the pre-decoding confidence in the bits, measurement circuit 512 may alternatively calculate the average soft-bit magnitude, either over the entire L CCEs or over part of the L CCEs, and provide the average soft-bit magnitude to control circuit 510. Alternatively, measurement circuit 512 may perform an RSRQ measurement by evaluating reference symbol REs compared to wideband radio power measurements and provide the RSRQ measurement to control circuit 510.

Control circuit 510 may then evaluate the radio measurement in 610 in order to determine whether the radio measurement indicates that radio conditions are sufficient to utilize reduced aggregation levels during decoding. In particular, control circuit 510 may compare the radio measurement to one or more thresholds to determine whether a reduced aggregation level should be used and, if yes, select an appropriate reduced aggregation level for decoding.

In a straightforward application, control circuit 510 may compare the radio measurement to a single predefined threshold and, if the radio measurement meets exceeds the predefined threshold, utilize a reduced aggregation level for one or more of the PDCCH candidates. For example, if the radio measurement exceeds the predefined threshold (thus indicating strong radio conditions), control circuit 510 may direct decoding circuit 506 to utilize a reduced aggregation level for decoding; for example, control circuit 510 may instruct decoding circuit 506 in 612 to utilize e.g. reduced aggregation level $L_{dec}=1$ for L=2 PDCCH candidates, reduced aggregation level $L_{dec}=2$ for L=4 PDCCH candidates, and reduced aggregation level $L_{dec}=4$ for L=8 PDCCH candidates. Alternatively, control circuit 510 may instruct decoding circuit 506 to utilize a reduced aggregation level e.g. $L_{dec}=1$ for L=2 PDCCH candidates, reduced aggregation level $L_{dec}=2$ for L=4 PDCCH candidates, and/or reduced aggregation level $L_{dec}=4$ for L=8 PDCCH candidates. Control circuit 510 may alternatively identify a reduced number of bits (which may include the encoded bits of part of one or more CCEs in addition to one or more entire CCEs) and utilize this reduced number of bits to decode the PDCCH candidates.

However, while still within the scope of this disclosure, this approach of merely selecting a reduced aggregation level for decoding based on a single threshold may not be optimal. As opposed to using a single threshold, control circuit 510 may perform the determination of 610 by comparing the radio measurement to multiple thresholds each corresponding to different aggregation level in order to identify a reduced aggregation level $L_{dec}$ that is optimal. For example, by using 4 thresholds each respectively assigned to aggregation level 1, 2, 4, or 8, control circuit 510 may select the reduced aggregation level $L_{dec}$ that best matches the radio measurement, i.e. that is expected to provide suitable decoding performance given the radio measurement with the lowest aggregation level.

In order to target suitable decoding performance, control circuit 510 may utilize a target Block Error Rate (BLER) to select an optimal reduced aggregation level $L_{dec}$, i.e. may select an $L_{dec}$ that will provide at least the target BLER. As SNR radio measurements may be an effective indicator of BLER, measurement circuit 512 may perform SNR measurements in 610 and provide the SNR measurements to control circuit 510 for selection of $L_{dec}$ in 610 and 612.

Figure 7:
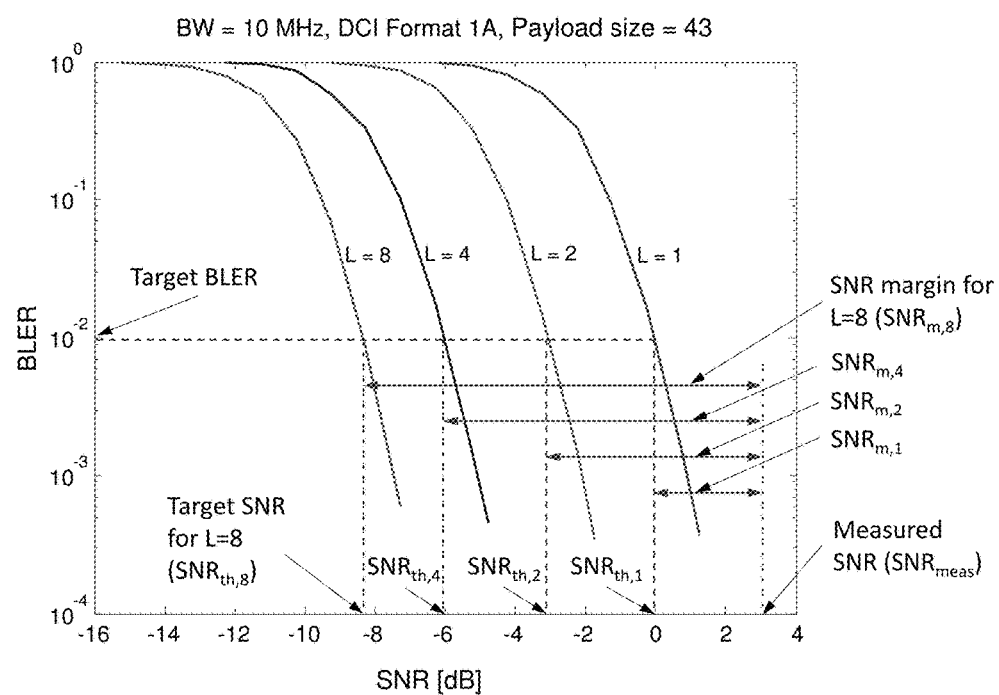
FIG. 7 shows an SNR vs. BLER plot.

FIG. 7 shows an exemplary plot of BLER vs. SNR for a 10 MHz bandwidth signal for DCI Format 1A with payload and CRC size B=43. An exemplary target BLER for control channels may be 0.01 as marked in FIG. 7. Given the increasing coding and energy gains offered by higher aggregation levels, CCEs with L=8 may provide the target BLER at lower SNRs than CCEs with L=4, etc. As denoted by each of the curves in FIG. 7, CCEs with L=8 may provide the target BLER with an SNR of −8.4 dB, CCEs with L=4 may provide the target BLER with an SNR of −6 dB, CCEs with L=2 may provide the target BLER with an SNR of −3.2 dB, and CCEs with L=1 may provide the target BLER with an SNR of 0 dB. Each of the target SNR values $SNR_{th,L}$ may account for both energy and coding gains associated with the redundancy in the encoded PDCCH bit sequences $b_{rm}(k)$.

In other words, if the SNR is 0 dB or higher, only 1 CCE will be needed to provide the target BLER, if the SNR is between −3.2 and 0 dB a minimum of two CCEs will be needed to provide the target BLER, if the SNR is between −6 and −3.2 dB a minimum of four CCEs will be needed to provide the target BLER, while if the SNR is between −8.4 and −6 dB a minimum of eight CCEs will be needed to provide the target BLER. Accordingly, in order to select an optimum $L_{dec}$, control circuit 510 may compare the measured SNR provided by measurement circuit 512 to multiple SNR thresholds in order to determine the minimum aggregation level $L_{dec}$ that will provide the target BLER. More specifically, control circuit 510 may utilize predefined SNR thresholds $SNR_{th,8}=-8.4$, $SNR_{th,4}=-6$, $SNR_{th,2}=-3.2$, and $SNR_{th,1}=0$ (all dB) to compare the measured SNR $SNR_{meas}$ (provided by measurement circuit 512) in order to identify which of $L_{dec}=1,2,4,8$ will provide the target BLER with a minimum number of CCEs.

Accordingly, control circuit 510 may compare $SNR_{meas}$ to $SNR_{th,8}$, $SNR_{th,4}$, $SNR_{th,2}$, and $SNR_{th,1}$ to identify whether $SNR_{meas}$ is greater than $SNR_{th,1}$, between $SNR_{th,2}$ and $SNR_{th,1}$, between $SNR_{th,4}$ and $SNR_{th,2}$, or less than $SNR_{th,4}$. If $SNR_{meas}$ is greater than $SNR_{th,1}$, control circuit 510 may select $L_{dec}=1$, i.e. as the measured SNR $SNR_{meas}$ indicates that the target BLER of 0.01 can be achieved with only one CCE. If $SNR_{meas}$ is between $SNR_{th,2}$ and $SNR_{th,1}$, control circuit 510 may select $L_{dec}=2$, i.e. as $SNR_{meas}$ indicates that one CCE is not enough to achieve the target BLER but two CCEs is sufficient. Similarly, if $SNR_{meas}$ is between $SNR_{th,4}$ and $SNR_{th,2}$, control circuit 510 may select $L_{dec}=4$, while control circuit 510 may select $L_{dec}=8$ if $SNR_{meas}$ is less than $SNR_{th,4}$ (control circuit 510 may thus not need to directly compare $SNR_{meas}$ to $SNR_{th,8}$).

Accordingly, control circuit 510 may select $L_{dec}$ as the minimum number of CCEs that will provide the target BLER given the measured SNR $SNR_{meas}$. Expressed mathematically, control circuit 510 may calculate $L_{dec}$ as $$L_{dec} = \min_{\substack{L \\ SNR_{m,L}>0}} SNR_{m,L} = \min_{\substack{L \\ SNR_{meas}>SNR_{th,L}}} (SNR_{meas} - SNR_{th,L}) \quad (3)$$

where $SNR_{m,l}$ denotes the SNR margin (or difference) between $SNR_{meas}$ and $SNR_{th,L}$. In other words, control circuit 510 may identify the lowest SNR threshold $SNR_{th,L}$ that $SNR_{meas}$ is greater than as $L_{dec}$.

Accordingly, Equation 3 may allow control circuit 510 to select a reduced aggregation level $L_{dec}$ for use during decoding that will preserve the target BLER given the observed SNR $SNR_{meas}$ with a minimum number of CCEs. For example, control circuit 510 may compare the measured SNR $SNR_{meas}$ provided by measurement circuit 512 to the target SNR in 610 to identify $L_{dec}$ satisfying Equation (3), which may be e.g. $L_{dec}=1$, i.e. $SNR_{meas}>0$ indicating that decoding circuit 506 may decode the PDCCH candidates with an aggregation level of $L_{dec}=1$ (i.e. decoding only one CCE of each PDCCH candidate) and still maintain the target BLER of 0.01. Accordingly, control circuit 510 may instruct decoding circuit 506 to decode the PDCCH candidates of CCE buffer 504 using reduced aggregation level $L_{dec}=1$ in 614.

As noted above, decoding structure 500 may alternatively utilize RSRQ and/or average soft bit magnitude radio measurements in place of SNR measurements. Accordingly, target BLERs and corresponding RSRQ and average soft bit magnitude thresholds may be defined and applied in an analogous manner to select $L_{dec}$. The target BLER and/or the radio measurement thresholds may be computed offline and pre-programmed into decoding structure 500 for retrieval during runtime. Furthermore, as opposed to calculating the reduced aggregation level $L_{dec}$ during each iteration of 610, control circuit 510 may utilize a lookup table that provides the appropriate aggregation level $L_{dec}$ based on the measured SNR $SNR_{meas}$ (i.e. control circuit 610 may input $SNR_{meas}$ into the lookup table and retrieve the output as $L_{dec}$, where the lookup table is defined based on the SNR thresholds $SNR_{th,L}$ for each aggregation level L). The 'comparison' of 610 may thus be implicit in either case, as control circuit 510 may only select a reduced aggregation level in place of the actual aggregation level if the measured SNR is above a predefined threshold.

Alternatively, control circuit 510 may analogously identify a reduced bit count $E_{dec}$ based on SNR margin $SNR_m$ that is less than the actual encoded bit count 72L for each PDCCH candidate and provide only the $E_{dec}$ bits of each PDCCH candidate to decoding circuit 506. As CCE groupings are logical assignments that refer to a set of 72L bits, utilizing either a reduced aggregation level $L_{dec}$ or reduced bit count $E_{dec}$ may produce analogous results (or identical results if $E_{dec}=72L_{dec}$). Each option is thus considered applicable, and accordingly different radio measurement thresholds may be analogously applied, such as e.g. different SNR thresholds $SNR_{th,E}$ that each correspond to a number of bits E that would satisfy a corresponding target BLER for decoding. Similarly, control circuit 510 may utilize SNR thresholds for e.g. L=3,5,7 CCEs. Regardless of the specifics of the selection of $L_{dec}$ or $E_{dec}$ to input to the decoder, control circuit 510 may evaluate a radio measurement to identify a reduced number of bits than actually assigned to certain PDCCH candidates and decode these PDCCH candidates with the reduced number of bits. Furthermore, the reduced number of bits may additionally be selected to achieve a target decoding performance metric such as a target BLER.

Decoding circuit 506 may then decode the PDCCH candidates in 614 with the reduced aggregation level $L_{dec}$ (or alternatively reduced bit count $E_{dec}$). For example, if $L_{dec}=1$, for each PDCCH candidate decoding circuit 506 may identify the starting CCE within CCE buffer 504 and retrieve only the 72 bits contained in the starting CCE (in accordance with the reduced aggregation level $L_{dec}=1$) from CCE buffer 504 (or alternatively the $E_{dec}$ bits of each PDCCH candidate). Decoding circuit 506 may then decode the bits for each PDCCH candidate in 614, such as with a Viterbi decoding scheme, to recover a decoded B bit sequence. It is noted that decoding circuit 506 may alternatively utilize a CCE other than the first CCE for PDCCH candidates with aggregation level L>1; however, such may potentially complicate decoding as the first B bits of the selected CCE may not be $b_0(k)$. Decoding circuit 506 may pass each decoded sequence to CRC check circuit 508, which may compare the 16 bit CRC of each decoded B bit sequence to each of the RNTIs assigned to mobile terminal 400. If the CRC of a given decoded sequence matches any of the RNTIs, CRC check circuit 508 may determine that the decoded sequence is a PDCCH scheduling message, i.e. a DCI Format, addressed to mobile terminal 400 and may retain the payload data (A bits). For example, CRC check circuit 508 may provide the payload data to control circuit 510 or another controller of mobile terminal 400, such as either a physical layer controller of physical layer processing circuit 408 or controller 410, which may proceed to perform radio communications (uplink or downlink) according to the uplink grant, downlink scheduling, or transmit power control specified by the PDCCH scheduling message. If the CRC of a given decoded sequence does not match any of the RNTIs assigned to mobile terminal 400, CRC check circuit 508 may discard the decoded sequence as a decode failure. As previously noted, decoding circuit 506 may need to decode each PDCCH candidate multiple times using different DCI Format assumptions, e.g. two times with DCI Format assumptions corresponding to the currently transmission mode configuration. In the event that a decode failure occurs with a reduced aggregation level $L_{dec}$, control circuit 510 may trigger another decoding attempt with a greater aggregation level (depending on the actual aggregation level assigned to the target PDCCH candidate).

Figure 8:
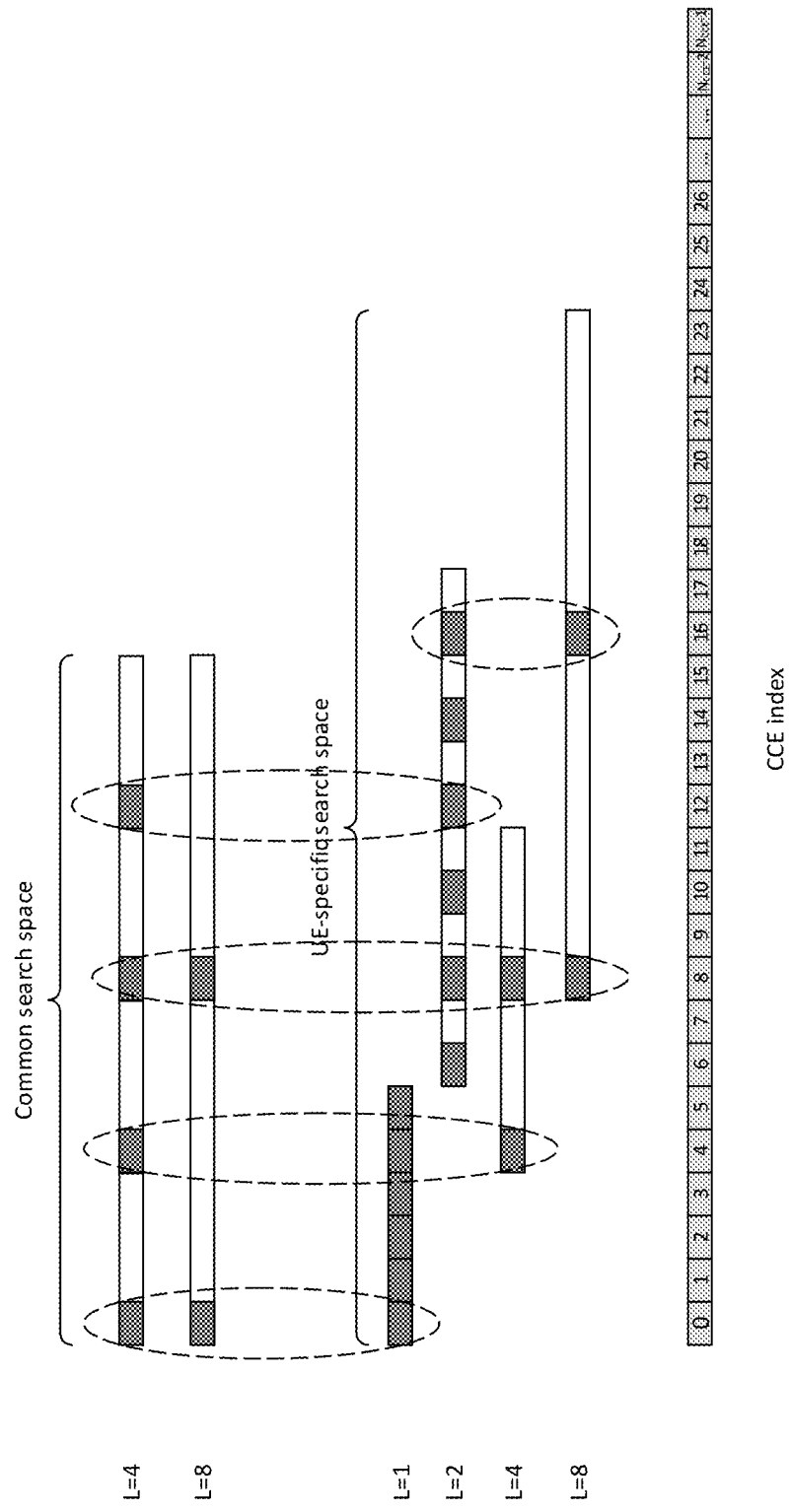
FIG. 8 shows a first exemplary PDCCH search procedure with a reduced decoding aggregation level.

FIG. 8 shows an example in which decoding structure 500 may apply a reduced aggregation level $L_{dec}=1$ to decode the PDCCH candidates introduced in FIG. 2, e.g. where $SNR_{meas}>SNR_{th,1}$. As shown in FIG. 8, decoding circuit 506 may only decode the first CCE assigned to each PDCCH candidate. Accordingly, as less bits are being input to decoding circuit 506 to decode each PDCCH candidate, the decoding time and required power expenditure may be substantially reduced. Even though some coding and energy gains may be sacrificed by only utilizing $L_{dec}$=1 CCEs (72 bits) of each PDCCH candidate for decoding, given the SNR margin $SNR_m$ decoding structure 500 may nevertheless be expected to maintain the target BLER during decoding. Decoding circuit 506 may additionally consolidate decode attempts for PDCCH candidates that overlap. For example, as shown by the dashed ellipse in FIG. 8 decoding circuit 506 may only need to decode e.g. CCE index n=1 a single time (per DCI Format hypothesis) as opposed to perform three separate attempts for each of the three PDCCH candidates (two common-search space and one UE-specific search space). The ability for decoding circuit 506 to consolidate decode attempts may depend on the overlap between the PDCCH candidates in each search space and whether the common search space and UE-specific search space overlap; however, such may allow decoding circuit 506 to further reduce decoding time. Such may be particularly advantageous for $L_{dec}$=1 cases as decoding circuit 506 may be able to consolidate decode attempts for each set of PDCCH candidates that have the same starting CCE (as opposed to having to decode different sets of contiguous CCEs for each PDCCH candidate).

Figure 9:
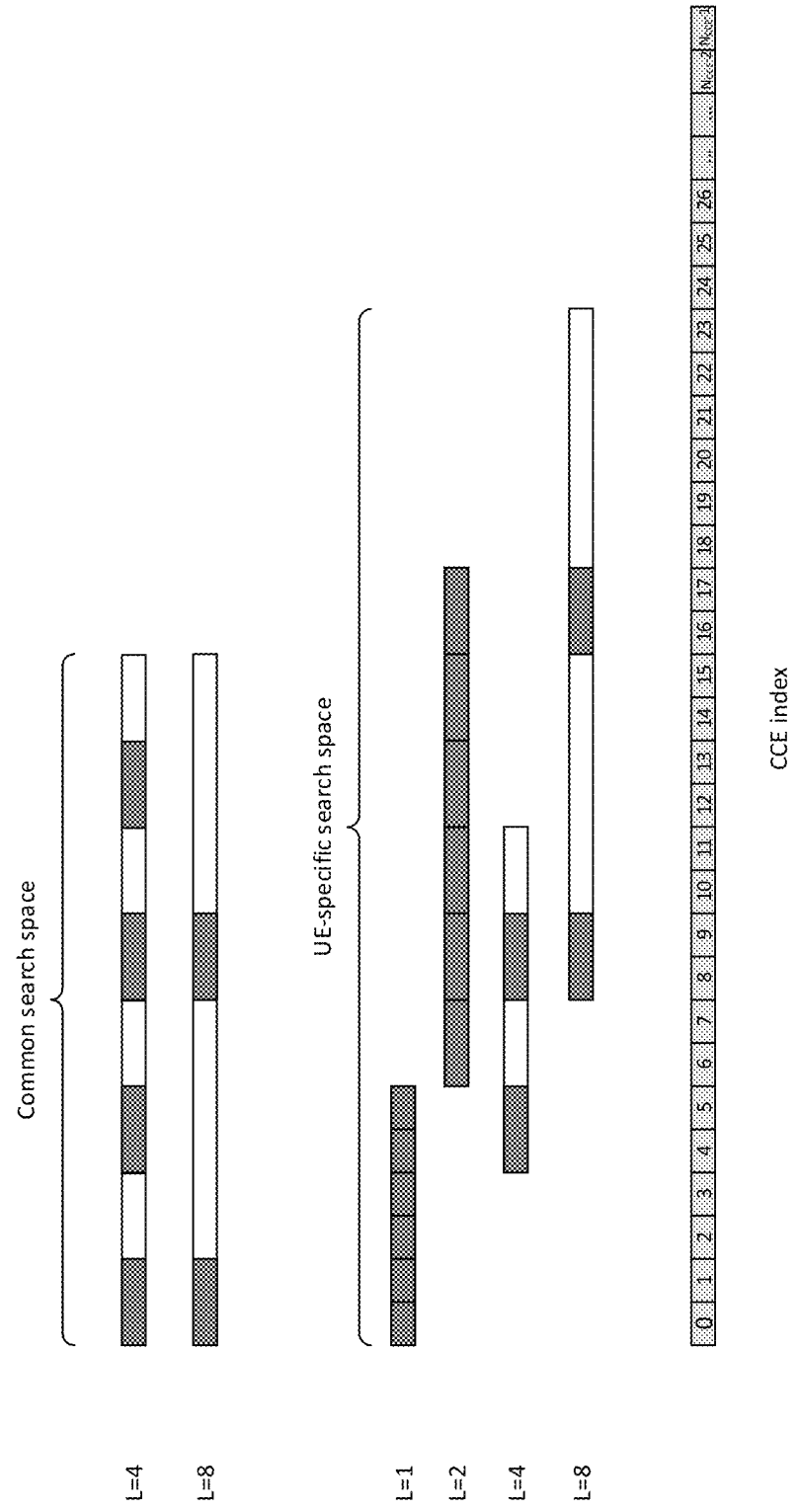
FIG. 9 shows a second exemplary PDCCH search procedure with a reduced decoding aggregation level.

FIG. 9 shows an example in which decoding structure 500 may apply a reduced aggregation level $L_{dec}$=2 to decode the PDCCH candidates of FIG. 2, e.g. where $SNR_{th,2}$<$SNR_{meas}$<$SNR_{th,1}$. Instead of only decoding $L_{dec}$=1 CCEs for each PDCCH candidate as in the example of FIG. 8, decoding circuit 506 may decode the first two CCEs assigned to each PDCCH candidate. As some of the PDCCH candidates may nevertheless utilize L=1 CCEs, decoding circuit 506 may still need to decode these PDCCH candidates with L=1 CCE as the transmitting LTE cell may still have utilized an aggregation level of L=1 (although the target BLER may not be expected to be maintained for decoding these PDCCH candidates). Decoding circuit 506 may still conserve significant time and power as each of the L=4 and L=8 PDCCH candidates may be decoded with only $L_{dec}$=2 CCEs. Similar scenarios may be shown for $L_{dec}$=4 (where $L_{dec}$=8 may be the maximum number of CCEs per PDCCH candidate and thus not offer any opportunities to decode less than the number of assigned CCEs).

Accordingly, control circuit 510 may utilize at least one predefined threshold in 610 in order to determine whether a reduced aggregation level $L_{dec}$ should be selected in 612. Alternatively, if the radio measurement is not greater than the predefined threshold in 610, control circuit 510 may direct decoding circuit 506 to proceed with the assigned aggregation levels L for each PDCCH candidate in 614. In this scenario, decoding circuit 506 may decode each PDCCH candidate with the L CCEs assigned to each PDCCH candidate, i.e. by retrieving the 72L bits for each PDCCH candidate from CCE buffer 504 and similarly decoding the bits for each PDCCH candidate before checking the CRC against the assigned RNTIs.

The advantageous decoding solution offered by decoding structure 500 may thus reduce decoding time and power consumption by performing the decode for each PDCCH candidate with a reduced amount of data, i.e. by decoding less than the L CCEs assigned to each PDCCH candidate, if radio measurements indicate that radio conditions are sufficient. Furthermore, the specific reduced aggregation level $L_{dec}$ used for decoding may be based on maintaining a target BLER.

Figure 10:
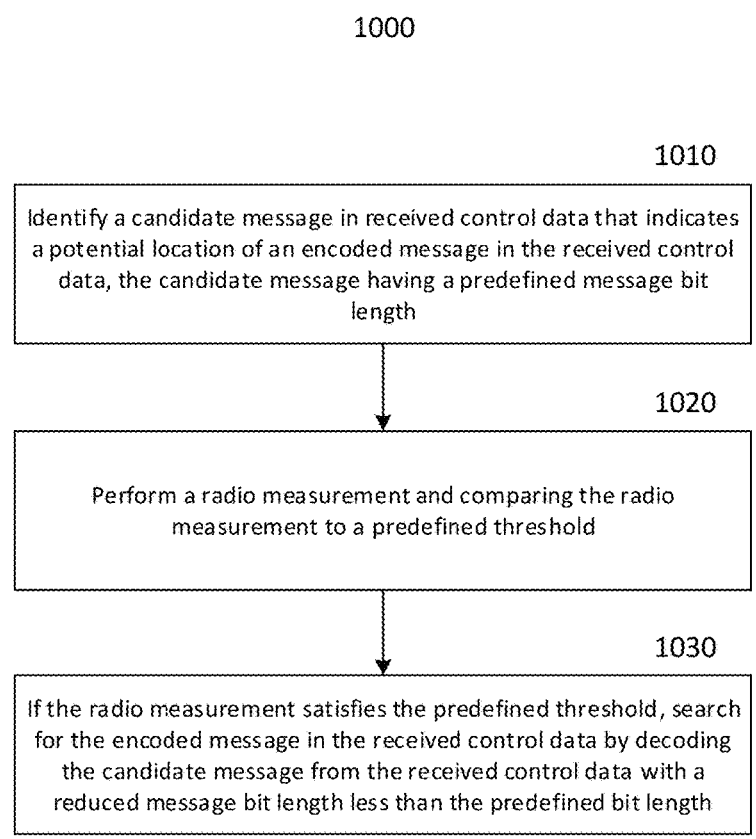
FIG. 10 shows a first method of decoding control data for radio communications.

FIG. 10 shows method 1000 of decoding control data for radio communications. As shown in FIG. 10, method 1000 includes identifying a candidate message in received control data that indicates a potential location of an encoded message in the received control data (1010), the candidate message having a predefined message bit length, performing a radio measurement and comparing the radio measurement to a predefined threshold (1020), and, if the radio measurement satisfies the predefined threshold, searching for the encoded message in the received control data by decoding the candidate message from the received control data with a reduced message bit length less than the predefined bit length (1030).

Figure 11:
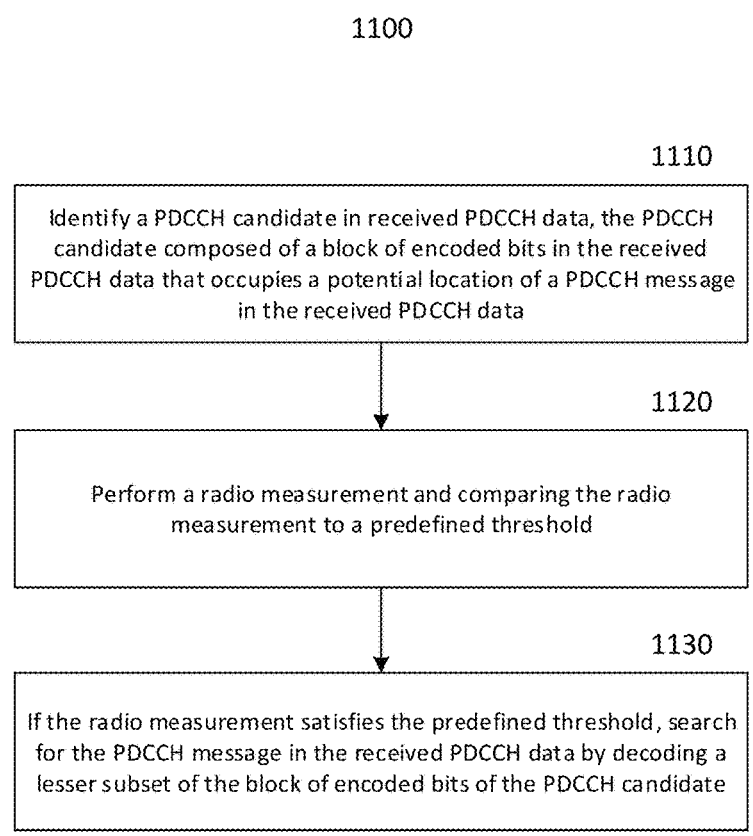
FIG. 11 shows a second method of decoding control data for radio communications.

FIG. 11 shows method 1100 of decoding PDCCH data in an LTE network. As shown in FIG. 11, method 1100 includes identifying a PDCCH candidate in received PDCCH data (1110), the PDCCH candidate composed of a block of encoded bits in the received PDCCH data that occupies a potential location of a PDCCH message in the received PDCCH data, performing a radio measurement and comparing the radio measurement to a predefined threshold (1120), and, if the radio measurement satisfies the predefined threshold, searching for the PDCCH message in the received PDCCH data by decoding a lesser subset of the block of encoded bits of the PDCCH candidate (1130).

In one or more further exemplary aspects of the disclosure, one or more of the features described above in reference to FIGS. 1-9 may be further incorporated into method 1000 and/or 1100. In particular, method 1000 and/or 1100 may be configured to perform further and/or alternate processes as detailed regarding mobile terminal 104 and/or detection structure 500.

The terms "user equipment", "UE", "mobile terminal", "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

The following examples pertain to further aspects of this disclosure:

Example 1 is a method of decoding control data for radio communications, the method including identifying a candidate message in received control data that indicates a potential location of an encoded message in the received control data, the candidate message having a predefined message bit length, performing a radio measurement and comparing the radio measurement to a predefined threshold, and if the radio measurement satisfies the predefined threshold, searching for the encoded message in the received control data by decoding the candidate message from the received control data with a reduced message bit length less than the predefined bit length.

In Example 2, the subject matter of Example 1 can optionally include wherein the encoded message is a Physical Downlink Control Channel (PDCCH) message and the received control data is PDCCH data received on a Long Term Evolution (LTE) network.

In Example 3, the subject matter of Example 1 or 2 can optionally include wherein the received control data is a plurality of Control Elements (CCEs), and wherein the candidate message occupies a subset of the plurality of CCEs according to the predefined message bit length.

In Example 4, the subject matter of any one of Examples 1 to 3 can optionally include wherein the encoded message is a Downlink Control Information (DCI) Format message.

In Example 5, the subject matter of Example 4 can optionally include wherein searching for the encoded message in the received control data by decoding the candidate message from the received control data with the reduced message bit length less than the predefined bit length includes decoding the candidate message with a first DCI Format assumption in a first decoding attempt and decoding the candidate message with a second DCI Format assumption in a second decoding attempt.

In Example 6, the subject matter of any one of Examples 1 to 5 can optionally include wherein the encoded message is an uplink power control command, an uplink transmission grant, or a downlink reception scheduling message.

In Example 7, the subject matter of any one of Examples 1 to 6 can optionally further include if the encoded message is detected in the received control data, executing one of an uplink power control command, an uplink transmission grant, or a downlink reception in response to the encoded message.

In Example 8, the subject matter of any one of Examples 1 to 7 can optionally include wherein the encoded message includes a number of essential bits corresponding to original payload bits and a number of redundant coding bits, the method further including selecting the reduced message bit length as a bit length greater than or equal to the number of essential bits and less than the number of redundant coding bits.

In Example 9, the subject matter of any one of Examples 1 to 7 can optionally include wherein the encoded message corresponds to an original unencoded message having a number of payload bits, the method further including selecting the reduced message bit length as a bit length greater than or equal to the number of payload bits and less than the predefined message bit length.

In Example 10, the subject matter of any one of Examples 1 to 7 can optionally include wherein the encoded message is rate-matched to the predefined message bit length using redundant coding bits, and wherein searching for the encoded message in the received control data by decoding the candidate message from the received control data with the reduced message bit length less than the predefined bit length includes decoding the candidate message without one or more bits of the candidate message corresponding to the redundant coding bits.

In Example 11, the subject matter of any one of Examples 1 to 10 can optionally further include identifying a plurality of additional candidate messages in the received control data each having a respective predefined bit length, and based on whether the radio measurement satisfies the predefined threshold, searching for the encoded message in the received control data by decoding each of the plurality of additional candidate messages with a respective reduced message bit length less than the respective predefined bit length of each of the plurality of additional candidate messages.

In Example 12, the subject matter of Example 11 can optionally include wherein the candidate message and each of the plurality of additional candidate messages indicate potential locations of the encoded message or one or more additional encoded messages in the received control data.

In Example 13, the subject matter of any one of Examples 1 to 12 can optionally include wherein the radio measurement indicates expected decoding success.

In Example 14, the subject matter of any one of Examples 1 to 13 can optionally include wherein the radio measurement is one of a Signal to Noise Ratio (SNR), Reference Signal Received Quality (RSRQ), or average soft bit magnitude.

In Example 15, the subject matter of any one of Examples 1 to 14 can optionally further include receiving radio communication data to obtain the received control data.

In Example 16, the subject matter of any one of Examples 1 to 15 can optionally include wherein the received control data is the data of a control region of a Transmission Time Interval (TTI).

In Example 17, the subject matter of any one of Examples 1 to 16 can optionally include wherein the predefined threshold is one of a plurality of predefined thresholds that each respectively correspond to a candidate message bit length, and wherein comparing the radio measurement to a predefined threshold includes comparing the radio measurement to the plurality of predefined thresholds, and selecting the reduced message bit length based on the comparison.

In Example 18, the subject matter of Example 17 can optionally include wherein selecting the reduced message bit length based on the comparison includes identifying the minimum-valued predefined threshold of the plurality of predefined thresholds that the radio measurement satisfies, and selecting the reduced message bit length as the candidate message bit length corresponding to the minimum-valued predefined threshold.

In Example 19, the subject matter of Example 17 or 18 can optionally include wherein the candidate message bit length corresponding to each of the plurality of predefined thresholds indicates a minimum number of bits that achieve a predefined decoding benchmark given the corresponding predefined threshold.

In Example 20, the subject matter of Example 19 can optionally include wherein the predefined decoding benchmarks are target Block Error Rates (BLERs).

In Example 21, the subject matter of any one of Examples 1 to 16 can optionally further include based on whether the radio measurement exceeds the predefined threshold, selecting the reduced message bit length based on a target decoding Block Error Rate (BLER).

In Example 22, the subject matter of any one of Examples 1 to 16 can optionally include wherein comparing the radio measurement to the predefined threshold includes determining the difference between the radio measurement and the predefined threshold, the method further including selecting the reduced message bit length based on the difference.

In Example 23, the subject matter of any one of Examples 1 to 22 can optionally include wherein searching for the encoded message in the received control data by decoding the candidate message from the received control data with the reduced message bit length less than the predefined bit length includes decoding the candidate message over the reduced message bit length to obtain a decoded message, comparing a decode success check of the decoded message with a predefined identification number, and identifying the decoded message as corresponding to the encoded message if the decode success check matches the predefined identification number.

In Example 24, the subject matter of Example 23 can optionally include wherein the decode success check is a Cyclic Redundancy Check (CRC) and the predefined identification address is a Radio Network Temporary Identifier (RNTI).

In Example 25, the subject matter of Example 23 or 24 can optionally further include discarding the decoded message if the decode success check does not match the predefined identification number.

Example 26 is a radio communication device configured to perform the method of any one of Examples 1 to 25.

Example 27 is a radio communication device including an antenna system, radio transceiver, and baseband circuit, the baseband circuit configured to perform the method of any one of Examples 1 to 25.

In Example 28, the subject matter of Example 26 or 27 can optionally be configured as a mobile terminal.

Example 29 is a circuit arrangement configured to perform the method of any one of Examples 1 to 25.

Example 30 is a method of decoding Physical Downlink Control Channel (PDCCH) data in a Long Term Evolution (LTE) network, the method including identifying a PDCCH candidate in received PDCCH data, the PDCCH candidate composed of a block of encoded bits in the received PDCCH data that occupies a potential location of a PDCCH message in the received PDCCH data, performing a radio measurement and comparing the radio measurement to a predefined threshold, and if the radio measurement satisfies the predefined threshold, searching for the PDCCH message in the received PDCCH data by decoding a lesser subset of the block of encoded bits of the PDCCH candidate.

In Example 1, the subject matter of Example 30 can optionally include wherein the PDCCH message is a Downlink Control Indicator (DCI) Format message.

In Example 2, the subject matter of Example 31 can optionally include wherein searching for the PDCCH message in the received PDCCH data by decoding the lesser subset of the block of encoded bits of the PDCCH candidate includes decoding the PDCCH candidate with a first DCI Format assumption in a first decoding attempt and decoding the PDCCH candidate with a second DCI Format assumption in a second decoding attempt.

In Example 3, the subject matter of any one of Examples 30 to 32 can optionally include wherein the PDCCH data is composed of a plurality of Control Channel Element (CCEs), wherein the PDCCH candidate occupies an integer number of the plurality of CCEs.

In Example 34, the subject matter of any one of Examples 30 to 33 can optionally include wherein the PDCCH message is an uplink power control command, and uplink transmission grant, or a downlink reception scheduling message.

In Example 35, the subject matter of any one of Examples 30 to 34 can optionally include wherein the PDCCH message is a Downlink Control Indicator (DCI) Format message, the method further including if the PDCCH message is detected in the received PDCCH data, executing one of an uplink power control command, an uplink transmission grant, or a downlink reception in response to the DCI Format message.

In Example 36, the subject matter of any one of Examples 30 to 35 can optionally include wherein the PDCCH message includes an essential plurality of bits corresponding to original payload bits and a plurality of redundant coding bits, the method further including selecting the lesser subset of the block of encoded bits as containing at least the essential plurality of bits and less than all of the plurality of redundant coding bits.

In Example 37, the subject matter of any one of Examples 30 to 35 can optionally include wherein the PDCCH message is rate-matched to fit into the block of encoded bits with one or more redundant coding bits, the method further including omitting at least one bit of the PDCCH candidate corresponding to the one or more redundant coding bits from the lesser subset of the block of encoded bits.

In Example 38, the subject matter of any one of Examples 30 to 35 can optionally include wherein the PDCCH message is rate-matched to fit into the block of encoded bits with one or more redundant coding bits, and wherein searching for the PDCCH message in the received PDCCH data by decoding the lesser subset of the block of encoded bits of the PDCCH candidate includes decoding the PDCCH candidate without at least one bit of the PDCCH candidate corresponding to the one or more redundant coding bits.

In Example 39, the subject matter of any one of Examples 30 to 38 can optionally further include identifying a plurality of additional PDCCH candidates in the received PDCCH data, each of the plurality of additional PDCCH candidates composed of a respective block of encoded bits of the received PDCCH data, and based on whether the radio measurement satisfies the predefined threshold, searching for the PDCCH message in the received PDCCH data by decoding a lesser subset of the respective block of encoded bits of each of the plurality of additional PDCCH candidates.

In Example 40, the subject matter of Example 39 can optionally include wherein the candidate message and each of the plurality of additional candidate messages indicate potential locations of the PDCCH message or one or more additional PDCCH message in the received PDCCH data.

In Example 41, the subject matter of any one of Examples 30 to 40 can optionally include wherein the radio measurement indicates expected decoding success.

In Example 42, the subject matter of any one of Examples 30 to 41 can optionally include wherein the radio measurement is one of a Signal to Noise Ratio (SNR), Reference Signal Received Quality (RSRQ), or average soft bit magnitude.

In Example 43, the subject matter of any one of Examples 30 to 42 can optionally further include receiving radio communication data to obtain the received PDCCH data.

In Example 44, the subject matter of any one of Examples 30 to 43 can optionally include wherein the received PDCCH data is control region data of an LTE subframe.

In Example 45, the subject matter of any one of Examples 30 to 44 can optionally further include identifying the lesser subset of the block of encoded bits based on a target decoding Block Error Rate.

In Example 46, the subject matter of any one of Examples 30 to 45 can optionally include wherein the predefined threshold is one of a plurality of predefined thresholds that each respectively correspond to a decoding bit block size, and wherein comparing the radio measurement to a predefined threshold includes comparing the radio measurement to the plurality of predefined thresholds, and selecting the lesser subset of the block of encoded bits based on the comparison.

In Example 47, the subject matter of Example 46 can optionally include wherein selecting the lesser subset of the block of encoded bits based on the comparison includes identifying the minimum-valued predefined threshold of the plurality of predefined thresholds that the radio measurement satisfies, and selecting the lesser subset of the block of encoded bits as a block of the encoded bits having the decoding bit block size corresponding to the minimum-valued predefined threshold.

In Example 48, the subject matter of Example 46 or 47 can optionally include wherein the decoding bit block size corresponding to each of the plurality of predefined thresholds indicates a minimum number of bits that achieve a predefined decoding benchmark given the corresponding predefined threshold.

In Example 49, the subject matter of Example 48 can optionally include wherein the predefined decoding benchmarks are target Block Error Rates (BLERs).

In Example 50, the subject matter of any one of Examples 30 to 45 can optionally include wherein comparing the radio measurement to the predefined threshold includes determining the difference between the radio measurement and the predefined threshold, the method further including selecting the reduced message bit length based on the difference.

In Example 51, the subject matter of any one of Examples 30 to 50 can optionally include wherein searching for the PDCCH message in the received PDCCH data by decoding the lesser subset of the block of encoded bits of the PDCCH candidate includes decoding the lesser subset of the block of encoded bits of the PDCCH candidate to obtain a decoded PDCCH message, comparing a Cyclic Redundancy Check (CRC) of the decoded PDCCH message to a Radio Network Temporary Identifier (RNTI), and identifying the decoded PDCCH message as corresponding to the PDCCH message if the CRC matches the RNTI.

In Example 52, the subject matter of Example 51 can optionally further include discarding the decoded PDCCH message if the CRC does not match the RNTI.

Example 53 is a radio communication device configured to perform the method of any one of Examples 30 to 52.

Example 54 is a radio communication device including an antenna system, radio transceiver, and baseband circuit, the baseband circuit configured to perform the method of any one of Examples 30 to 52.

In Example 55, the subject matter of Example 54 can optionally be configured as a mobile terminal.

Example 56 is a circuit arrangement configured to perform the method of any one of Examples 30 to 52.

Example 57 is a circuit arrangement including a control circuit configured to identify a candidate message in received control data that indicates a potential location of an encoded message in the received control data, the candidate message having a predefined message bit length, a measurement circuit configured to perform a radio measurement, the control circuit further configured to compare the radio measurement to a predefined threshold, and a decoding circuit further configured to, if the radio measurement satisfies the predefined threshold, search for the encoded message in the received control data by decoding the candidate message from the received control data with a reduced message bit length less than the predefined bit length.

In Example 58, the subject matter of Example 57 can optionally be configured as a radio communication device and further including an antenna system and a radio transceiver.

In Example 59, the subject matter of Example 58 can optionally include wherein the radio transceiver is further configured to receive radio communication data via the antenna system to obtain the received control data.

In Example 60, the subject matter of Example 57 can optionally include wherein the encoded message is a Physical Downlink Control Channel (PDCCH) message and the received control data is PDCCH data received on a Long Term Evolution (LTE) network.

In Example 61, the subject matter of any one of Examples 57 to 60 can optionally include wherein the received control data is a plurality of Control Channel Elements (CCEs), and wherein the candidate message occupies a subset of the plurality of CCEs according to the predefined message length.

In Example 62, the subject matter of any one of Examples 57 to 61 can optionally include wherein the encoded message is a Downlink Control Information (DCI) Format message.

In Example 63, the subject matter of Example 62 can optionally include wherein the decoding circuit is configured to search for the encoded message in the received control data by decoding the candidate message from the received control data with the reduced message bit length less than the predefined bit length by decoding the candidate message with a first DCI Format assumption in a first decoding attempt and decoding the candidate message with a second DCI Format assumption in a second decoding attempt.

In Example 64, the subject matter of any one of Examples 57 to 63 can optionally include wherein the encoded message is an uplink power control command, an uplink transmission grant, or a downlink reception scheduling message.

In Example 65, the subject matter of any one of Examples 57 to 64 can optionally include wherein the control circuit is further configured to if the encoded message is detected in the received control data, execute one of an uplink power control command, an uplink transmission grant, or a downlink reception in response to the encoded message.

In Example 66, the subject matter of any one of Examples 57 to 65 can optionally include wherein the encoded message includes a number of essential bits corresponding to original payload bits and a number of redundant coding bits, the control circuit further configured to select the reduced message bit length as a bit length greater than or equal to the number of essential bits and less than the number of redundant coding bits.

In Example 67, the subject matter of any one of Examples 57 to 65 can optionally include wherein the encoded message corresponds to an original unencoded message having a number of payload bits, the control circuit further configured to select the reduced message bit length as a bit length greater than or equal to the number of payload bits and less than the predefined message bit length.

In Example 68, the subject matter of any one of Examples 57 to 65 can optionally include wherein the encoded message is rate-matched to the predefined message bit length using redundant coding bits, the decoding circuit configured to search for the encoded message in the received control data by decoding the candidate message from the received control data with the reduced message bit length less than the predefined bit length by decoding the candidate message without one or more bits of the candidate message corresponding to the redundant coding bits.

In Example 69, the subject matter of any one of Examples 57 to 68 can optionally include wherein the control circuit is further configured to identify a plurality of additional candidate messages in the received control data each having a respective predefined bit length, the decoding circuit configured to, based on whether the radio measurement satisfies the predefined threshold, search for the encoded message in the received control data by decoding each of the plurality of additional candidate messages with a respective reduced message bit length less than the respective predefined bit length of each of the plurality of additional candidate messages.

In Example 70, the subject matter of Example 69 can optionally include wherein the candidate message and each of the plurality of additional candidate messages indicate potential locations of the encoded message or one or more additional encoded messages in the received control data.

In Example 71, the subject matter of any one of Examples 57 to 69 can optionally include wherein the radio measurement indicates expected decoding success.

In Example 72, the subject matter of any one of Examples 57 to 71 can optionally include wherein the radio measurement is one of a Signal to Noise Ratio (SNR), Reference Signal Received Quality (RSRQ), or average soft bit magnitude.

In Example 73, the subject matter of any one of Examples 57 to 72 can optionally include wherein the received control data is the data of a control region of a Transmission Time Interval (TTI).

In Example 74, the subject matter of any one of Examples 57 to 73 can optionally include wherein the predefined threshold is one of a plurality of predefined thresholds that each respectively correspond to a candidate message bit length, and wherein the control circuit is configured to compare the radio measurement to a predefined threshold by comparing the radio measurement to the plurality of predefined thresholds, and selecting the reduced message bit length based on the comparison.

In Example 75, the subject matter of Example 71 can optionally include wherein the control circuit is configured to select the reduced message bit length based on the comparison by identifying the minimum-valued predefined threshold of the plurality of predefined thresholds that the radio measurement satisfies, and selecting the reduced message bit length as the candidate message bit length corresponding to the minimum-valued predefined threshold.

In Example 76, the subject matter of Example 74 or 75 can optionally include wherein the candidate message bit length corresponding to each of the plurality of predefined thresholds indicates a minimum number of bits that achieve a predefined decoding benchmark given the corresponding predefined threshold.

In Example 77, the subject matter of Example 76 can optionally include wherein the predefined decoding benchmarks are target Block Error Rates (BLERs).

In Example 78, the subject matter of any one of Examples 57 to 73 can optionally include wherein the control circuit is further configured to, based on whether the radio measurement exceeds the predefined threshold, select the reduced message bit length based on a target decoding Block Error Rate (BLER).

In Example 79, the subject matter of any one of Examples 57 to 73 can optionally include wherein the control circuit is further configured to compare the radio measurement to the predefined threshold by determining the difference between the radio measurement and the predefined threshold and selecting the reduced message bit length based on the difference.

In Example 80, the subject matter of any one of Examples 57 to 73 can optionally include wherein the decoding circuit is configured to search for the encoded message in the received control data by decoding the candidate message from the received control data with the reduced message bit length less than the predefined bit length by decoding the candidate message over the reduced message bit length to obtain a decoded message, the circuit arrangement further including a check circuit configured to compare a decode success check of the decoded message with a predefined identification number, and identify the decoded message as corresponding to the encoded message if the decode success check matches the predefined identification number.

In Example 81, the subject matter of Example 80 can optionally include wherein the decode success check is a Cyclic Redundancy Check (CRC) and the predefined identification address is a Radio Network Temporary Identifier (RNTI).

In Example 82, the subject matter of Example 80 or 81 can optionally include wherein the check circuit is further configured to discard the decoded message if the decode success check does not match the predefined identification number.

Example 83 is a circuit arrangement including a control circuit configured to identify a Physical Downlink Control Channel (PDCCH) candidate in received PDCCH data, the PDCCH candidate composed of a block of encoded bits in the received PDCCH data that occupies a potential location of a PDCCH message in the received PDCCH data, a measurement circuit configured to perform a radio measurement, the control circuit configured to compare the radio measurement to a predefined threshold, and a decoding circuit configured to, if the radio measurement satisfies the predefined threshold, search for the PDCCH message in the received PDCCH data by decoding a lesser subset of the block of encoded bits of the PDCCH candidate.

In Example 84, the subject matter of Example 83 can optionally be configured as a radio communication device and further including an antenna system and a radio transceiver.

In Example 85, the subject matter of Example 84 can optionally include wherein the radio transceiver is further configured to receive radio communication data to obtain the received PDCCH data.

In Example 86, the subject matter of any one of Examples 83 to 85 can optionally include wherein the PDCCH message is a Downlink Control Indicator (DCI) Format message.

In Example 87, the subject matter of Example 86 can optionally include wherein the decoding circuit is configured to search for the PDCCH message in the received PDCCH data by decoding the lesser subset of the block of encoded bits of the PDCCH candidate by decoding the PDCCH candidate with a first DCI Format assumption in a first decoding attempt and decoding the PDCCH candidate with a second DCI Format assumption in a second decoding attempt.

In Example 88, the subject matter of any one of Examples 83 to 87 can optionally include wherein the PDCCH data is composed of a plurality of Control Channel Element (CCEs), wherein the PDCCH candidate occupies an integer number of the plurality of CCEs.

In Example 89, the subject matter of any one of Examples 83 to 88 can optionally include wherein the PDCCH message is an uplink power control command, and uplink transmission grant, or a downlink reception scheduling message.

In Example 90, the subject matter of any one of Examples 83 to 89 can optionally include wherein the PDCCH message is a Downlink Control Indicator (DCI) Format message, the control circuit further configured to, if the PDCCH message is detected in the received PDCCH data, execute one of an uplink power control command, an uplink transmission grant, or a downlink reception in response to the DCI Format message.

In Example 91, the subject matter of any one of Examples 83 to 89 can optionally include wherein the PDCCH message includes an essential plurality of bits corresponding to original payload bits and a plurality of redundant coding bits, the control circuit further configured to select the lesser subset of the block of encoded bits as containing at least the essential plurality of bits and less than all of the plurality of redundant coding bits.

In Example 92, the subject matter of any one of Examples 83 to 89 can optionally include wherein the PDCCH message is rate-matched to fit into the block of encoded bits with one or more redundant coding bits, the decoding circuit configured to search for the PDCCH message in the received PDCCH data by decoding the lesser subset of the block of encoded bits of the PDCCH candidate by decoding the PDCCH candidate without at least one bit of the PDCCH candidate corresponding to the one or more redundant coding bits.

In Example 93, the subject matter of any one of Examples 83 to 92 can optionally include the control circuit further configured to identify a plurality of additional PDCCH candidates in the received PDCCH data, each of the plurality of additional PDCCH candidates composed of a respective block of encoded bits of the received PDCCH data, and based on whether the radio measurement satisfies the predefined threshold, search for the PDCCH message in the received PDCCH data by decoding a lesser subset of the respective block of encoded bits of each of the plurality of additional PDCCH candidates.

In Example 94, the subject matter of Example 93 can optionally include wherein the candidate message and each of the plurality of additional candidate messages indicate potential locations of the PDCCH message or one or more additional PDCCH message in the received PDCCH data.

In Example 95, the subject matter of any one of Examples 83 to 94 can optionally include wherein the radio measurement indicates expected decoding success.

In Example 96, the subject matter of any one of Examples 83 to 95 can optionally include wherein the radio measurement is one of a Signal to Noise Ratio (SNR), Reference Signal Received Quality (RSRQ), or average soft bit magnitude.

In Example 97, the subject matter of any one of Examples 83 to 96 can optionally include wherein the received PDCCH data is control region data of an LTE subframe.

In Example 98, the subject matter of any one of Examples 83 to 97 can optionally include wherein the predefined threshold is one of a plurality of predefined thresholds that each respectively correspond to a decoding bit block size, and wherein the control circuit is configured to compare the radio measurement to a predefined threshold by comparing the radio measurement to the plurality of predefined thresholds, and selecting the lesser subset of the block of encoded bits based on the comparison.

In Example 99, the subject matter of Example 98 can optionally include wherein the control circuit is configured to select the lesser subset of the block of encoded bits based on the comparison by identifying the minimum-valued predefined threshold of the plurality of predefined thresholds that the radio measurement satisfies, and selecting the lesser subset of the block of encoded bits as a block of the encoded bits having the decoding bit block size corresponding to the minimum-valued predefined threshold.

In Example 100, the subject matter of Example 97 can optionally include 98, wherein the decoding bit block size corresponding to each of the plurality of predefined thresholds indicates a minimum number of bits that achieve a predefined decoding benchmark given the corresponding predefined threshold.

In Example 101, the subject matter of Example 100 can optionally include wherein the predefined decoding benchmarks are target Block Error Rates (BLERs).

In Example 102, the subject matter of any one of Examples 83 to 97 can optionally include the control circuit further configured to identify the lesser subset of the block of encoded bits based on a target decoding Block Error Rate.

In Example 103, the subject matter of any one of Examples 83 to 102 can optionally include wherein the control circuit is configured to compare the radio measurement to the predefined threshold by determining the difference between the radio measurement and the predefined threshold, the method further including selecting the reduced message bit length based on the difference.

In Example 104, the subject matter of any one of Examples 83 to 103 can optionally include wherein the decoding circuit is configured to search for the PDCCH message in the received PDCCH data by decoding the lesser subset of the block of encoded bits of the PDCCH candidate by decoding the lesser subset of the block of encoded bits of the PDCCH candidate to obtain a decoded PDCCH message, the circuit arrangement further including a check circuit configured to compare a Cyclic Redundancy Check (CRC) of the decoded PDCCH message to a Radio Network Temporary Identifier (RNTI), and identify the decoded PDCCH message as corresponding to the PDCCH message if the CRC matches the RNTI.

In Example 105, the subject matter of Example 104 can optionally include wherein the check circuit is further configured to discard the decoded PDCCH message if the CRC does not match the RNTI.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement comprising:
   a control circuit configured to identify a candidate message in received control data that indicates a potential location of an encoded message, comprising essential bits and redundant coding bits, in the received control data, the candidate message having a predefined message bit length,
   the control circuit further configured to select a reduced message bit length as a bit length greater than or equal to the essential bits and less than the predefined message bit length;

a measurement circuit configured to perform a radio measurement, the control circuit further configured to compare the radio measurement to a predefined threshold; and a decoding circuit further configured to, if the radio measurement satisfies the predefined threshold, search for the encoded message in the received control data by decoding the candidate message from the received control data with the reduced message bit length.

2. The circuit arrangement of claim 1, configured as a radio communication device and further comprising an antenna system and a radio transceiver.

3. The circuit arrangement of claim 1, wherein the control circuit is further configured to:
if the encoded message is detected in the received control data, execute one of an uplink power control command, an uplink transmission grant, or a downlink reception in response to the encoded message.

4. The circuit arrangement of claim 1, wherein each of the essential bits correspond to a respective unencoded bit of an original bit sequence and the redundant coding bits redundantly correspond to the unencoded bits of the original bit sequence.

5. The circuit arrangement of claim 1, wherein the encoded message is rate-matched to the predefined message bit length using redundant coding bits,
the decoding circuit configured to search for the encoded message in the received control data by decoding the candidate message from the received control data with the reduced message bit length less than the predefined bit length by:
decoding the candidate message without one or more bits of the candidate message corresponding to the redundant coding bits.

6. The circuit arrangement of claim 1, wherein the control circuit is further configured to:
identify a plurality of additional candidate messages in the received control data each having a respective predefined bit length,
the decoding circuit configured to, based on whether the radio measurement satisfies the predefined threshold, search for the encoded message in the received control data by decoding each of the plurality of additional candidate messages with a respective reduced message bit length less than the respective predefined bit length of each of the plurality of additional candidate messages.

7. The circuit arrangement of claim 1, wherein the radio measurement is one of a Signal to Noise Ratio (SNR), Reference Signal Received Quality (RSRQ), or average soft bit magnitude.

8. The circuit arrangement of claim 1, wherein the predefined threshold is one of a plurality of predefined thresholds that each respectively correspond to a candidate message bit length, and wherein the control circuit is configured to compare the radio measurement to a predefined threshold by:
comparing the radio measurement to the plurality of predefined thresholds; and
selecting the reduced message bit length based on the comparison.

9. The circuit arrangement of claim 8, wherein the control circuit is configured to select the reduced message bit length based on the comparison by:
identifying the minimum-valued predefined threshold of the plurality of predefined thresholds that the radio measurement satisfies; and
selecting the reduced message bit length as the candidate message bit length corresponding to the minimum-valued predefined threshold.

10. The circuit arrangement of claim 8, wherein the candidate message bit length corresponding to each of the plurality of predefined thresholds indicates a minimum number of bits that achieve a predefined decoding benchmark given the corresponding predefined threshold.

11. The circuit arrangement of claim 10, wherein the predefined decoding benchmarks are target Block Error Rates (BLERs).

12. A circuit arrangement comprising:
a control circuit configured to identify a Physical Downlink Control Channel (PDCCH) candidate in received PDCCH data, the PDCCH candidate composed of a block of encoded bits in the received PDCCH data that occupies a potential location of a PDCCH message in the received PDCCH data, wherein the PDCCH message comprises an essential plurality of bits and a plurality of redundant coding bits,
the control circuit further configured to select a lesser subset of the block of encoded bits that comprises at least the essential plurality of bits and less than all of the plurality of redundant coding bits;
a measurement circuit configured to perform a radio measurement, the control circuit configured to compare the radio measurement to a predefined threshold; and
a decoding circuit configured to, if the radio measurement satisfies the predefined threshold, search for the PDCCH message in the received PDCCH data by decoding the lesser subset of the block of encoded bits of the PDCCH candidate.

13. The circuit arrangement of claim 12, configured as a radio communication device and further comprising an antenna system and a radio transceiver.

14. The circuit arrangement of claim 12, wherein the PDCCH message is a Downlink Control Indicator (DCI) Format message, the control circuit further configured to, if the PDCCH message is detected in the received PDCCH data, execute one of an uplink power control command, an uplink transmission grant, or a downlink reception in response to the DCI Format message.

15. The circuit arrangement of claim 12, the control circuit further configured to:
identify a plurality of additional PDCCH candidates in the received PDCCH data, each of the plurality of additional PDCCH candidates composed of a respective block of encoded bits of the received PDCCH data; and
based on whether the radio measurement satisfies the predefined threshold, search for the PDCCH message in the received PDCCH data by decoding a lesser subset of the respective block of encoded bits of each of the plurality of additional PDCCH candidates.

16. The circuit arrangement of claim 12, wherein the radio measurement is one of a Signal to Noise Ratio (SNR), Reference Signal Received Quality (RSRQ), or average soft bit magnitude.

17. The circuit arrangement of claim 12, wherein the predefined threshold is one of a plurality of predefined thresholds that each respectively correspond to a decoding bit block size, and wherein the control circuit is configured to compare the radio measurement to a predefined threshold by:
comparing the radio measurement to the plurality of predefined thresholds; and
selecting the lesser subset of the block of encoded bits based on the comparison.

18. The circuit arrangement of claim 17, wherein the control circuit is configured to select the lesser subset of the block of encoded bits based on the comparison by:
- identifying the minimum-valued predefined threshold of the plurality of predefined thresholds that the radio measurement satisfies; and
- selecting the lesser subset of the block of encoded bits as a block of the encoded bits having the decoding bit block size corresponding to the minimum-valued predefined threshold.

19. A method of decoding control data for radio communications, the method comprising:
- identifying a candidate message in received control data that indicates a potential location of an encoded message, comprising essential bits and redundant coding bits, in the received control data, the candidate message having a predefined message bit length;
- selecting a reduced message bit length as a bit length greater than or equal to the essential bits and less than the predefined message bit length;
- performing a radio measurement and comparing the radio measurement to a predefined threshold; and
- if the radio measurement satisfies the predefined threshold, searching for the encoded message in the received control data by decoding the candidate message from the received control data with the reduced message bit length.

20. The method of claim 19, wherein the encoded message is an uplink power control command, an uplink transmission grant, or a downlink reception scheduling message.

21. The method of claim 19, wherein each of the essential bits correspond to a respective unencoded bit of an original bit sequence and the redundant coding bits redundantly correspond to the unencoded bits of the original bit sequence.

22. The method of claim 19, wherein the encoded message is rate-matched to the predefined message bit length using redundant coding bits, and wherein searching for the encoded message in the received control data by decoding the candidate message from the received control data with the reduced message bit length less than the predefined bit length comprises:
- decoding the candidate message without one or more bits of the candidate message corresponding to the redundant coding bits.

* * * * *